United States Patent
Vesely et al.

(10) Patent No.: US 9,681,352 B2
(45) Date of Patent: Jun. 13, 2017

(54) BEARER CONFIGURATION SIGNALING

(71) Applicant: Telefonaktiebolaget L M Ericsson (publ), Stockholm (SE)

(72) Inventors: Alexander Vesely, Feldbach (AT); Riikka Susitaival, Helsinki (FI); Stefan Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 241 days.

(21) Appl. No.: 14/395,845

(22) PCT Filed: May 7, 2014

(86) PCT No.: PCT/SE2014/050557
§ 371 (c)(1),
(2) Date: Oct. 21, 2014

(87) PCT Pub. No.: WO2014/182229
PCT Pub. Date: Nov. 13, 2014

(65) Prior Publication Data
US 2016/0021592 A1    Jan. 21, 2016

Related U.S. Application Data

(60) Provisional application No. 61/822,189, filed on May 10, 2013.

(51) Int. Cl.
*H04W 36/30* (2009.01)
*H04W 36/00* (2009.01)
(Continued)

(52) U.S. Cl.
CPC ............ *H04W 36/30* (2013.01); *H04B 7/024* (2013.01); *H04L 41/0816* (2013.01);
(Continued)

(58) Field of Classification Search
CPC ........... H04W 36/0072; H04W 76/025; H04W 36/30; H04W 72/085; H04W 76/046;
(Continued)

(56) References Cited

U.S. PATENT DOCUMENTS

2010/0273487 A1*  10/2010  Alonso-Rubio .... H04W 36/385
                                                              455/436
2012/0015656 A1    1/2012  Tiwari
(Continued)

FOREIGN PATENT DOCUMENTS

CN     102076041 A     5/2011
CN     102783211 A     11/2012
(Continued)

OTHER PUBLICATIONS

Huawei, HiSilicon: "Proposed SID: Study on UMTS Heterogeneous Networks", 3GPP™ Work Item Description; TSG RAN Meeting #57 Chicago, USA, Sep. 4-7, 2012, RP-121436; 5 pages. (Clean Version).

(Continued)

*Primary Examiner* — Jae Y Lee
(74) *Attorney, Agent, or Firm* — Sage Patent Group

(57) ABSTRACT

The disclosure relates to a method performed in a first network node for enabling dual connectivity for a communication device with the first network node and a second network node, wherein the communication device has at least one radio bearer set up with the first network node. The method comprises providing, to the second network node, a radio resource configuration request for the communication device and limits within which the second network node is to configure radio resources for the communication device, and receiving, from the second network node, a suggested radio resource configuration for the communication device. The disclosure also relates to network nodes, method in (Continued)

second network node and second network node, computer programs and computer program products.

21 Claims, 13 Drawing Sheets

(51) Int. Cl.

| | | |
|---|---|---|
| H04W 76/02 | (2009.01) | |
| H04L 12/24 | (2006.01) | |
| H04W 24/10 | (2009.01) | |
| H04W 72/08 | (2009.01) | |
| H04W 76/04 | (2009.01) | |
| H04B 7/024 | (2017.01) | |
| H04W 92/20 | (2009.01) | |
| H04L 5/00 | (2006.01) | |

(52) U.S. Cl.
CPC ....... *H04W 24/10* (2013.01); *H04W 36/0072* (2013.01); *H04W 72/085* (2013.01); *H04W 72/087* (2013.01); *H04W 76/025* (2013.01); *H04W 76/046* (2013.01); *H04L 5/0048* (2013.01); *H04W 92/20* (2013.01)

(58) Field of Classification Search
CPC ... H04W 72/087; H04W 24/10; H04W 92/20; H04L 41/0816; H04L 5/0048; H04B 7/024
See application file for complete search history.

(56) References Cited

U.S. PATENT DOCUMENTS

| | | | | |
|---|---|---|---|---|
| 2012/0039240 | A1* | 2/2012 | Han | H04B 7/155 370/315 |
| 2012/0149378 | A1* | 6/2012 | Li | H04W 36/0055 455/438 |
| 2013/0035101 | A1* | 2/2013 | Wang | H04W 36/08 455/437 |
| 2013/0088983 | A1 | 4/2013 | Pragada et al. | |
| 2013/0136074 | A1* | 5/2013 | Okino | H04W 24/00 370/329 |
| 2013/0329628 | A1* | 12/2013 | Yang | H04W 36/0072 370/315 |
| 2014/0128076 | A1* | 5/2014 | Adachi | H04W 36/08 455/436 |
| 2014/0301360 | A1* | 10/2014 | Bontu | H04W 36/0083 370/331 |
| 2014/0301371 | A1* | 10/2014 | Maeda | H04W 36/0011 370/331 |
| 2015/0195800 | A1* | 7/2015 | Zhu | H04W 72/12 370/311 |
| 2015/0208283 | A1* | 7/2015 | Yang | H04W 36/04 370/331 |
| 2015/0304891 | A1* | 10/2015 | Dinan | H04W 72/0413 370/331 |

FOREIGN PATENT DOCUMENTS

| | | |
|---|---|---|
| CN | 102835138 A | 12/2012 |
| WO | WO 2011/100492 A1 | 8/2011 |
| WO | WO 2011/109027 A1 | 9/2011 |
| WO | WO 2014/021763 A2 | 2/2014 |

OTHER PUBLICATIONS

Huawei, HiSilicon: "Proposed SID: Study on UMTS Heterogeneous Networks", 3GPP™ Work Item Description; TSG RAN Meeting #57 Chicago, USA, Sep. 4-7, 2012, RP-121436; 5 pages. (With Mark-up).

Ericsson, ST-Ericsson: "Initial considerations on Heterogeneous Networks for UMTS", 3GPP TSG RAN WG1 Meeting #70bis San Diego, CA, USA, Oct. 8-12, 2012, R1-124512; 7 pages.

Ericsson, ST-Ericsson: "Heterogeneous Network Deployment Scenarios", 3GPP TSG-RAN WG1 #70bis San Diego, CA, USA, Oct. 8-12, 2012, R1-124513; 3 pages.

Ericsson, ST-Ericsson: "Enhancing mobility robustness and offloading potential with RRC diversity", 3GPP TSG-RAN WG2 #81bis, Chicago, USA, Apr. 15-19, 2013, Tdoc R2-131211; 8 pages.

3GPP TS 23.203 V12.0.0 (Mar. 2013) $3^{rd}$ Generation Partnership Project; Technical Specification Group Services and System Aspects; Policy and charging control architecture (Release 12), 650 Route des Lucioles—Sophia Antipolis, Valbonne, France; 183 pages.

3GPP TS 36.133 V11.4.0 (Mar. 2013) $3^{rd}$ Generation Partnership Project; Technical Specification Group Radio Access Network; Evolved Universal Terrestrial Radio Access (E-UTRA); Requirements for support of radio resource management (Release 11), 650 Route des Lucioles—Sophia Antipolis, Valbonne, France; 676 pages.

3GPP TS 36.300 V11.5.0 (Mar. 2013), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 11), 650 Route des Lucioles—Sophia Antipolis, Valbonne, France; 209 pages.

3GPP TS 36.331 V10.9.0 (Mar. 2013), $3^{rd}$ Generation Partnership Project; Technical Specification Group Radio Access Network; Evolved Universal Terrestrial Radio Access (E-UTRA) Radio Resource Control (RRC); Protocol specification (Release 10), 650 Route des Lucioles—Sophia Antipolis, Valbonne, France; 307 pages.

3GPP TS 36.423 V11.4.0 (Mar. 2013) $3^{rd}$ Generation Partnership Project; Technical Specification Group Radio Access Network; Evolved Universal Terrestrial Radio Access Network (E-UTRAN); X2 application protocol (X2AP) (Release 11), 650 Route des Lucioles—Sophia Antipolis, Valbonne, France; 144 pages.

3GPP TS 36.842 V0.2.0 (May 2013) $3^{rd}$ Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), 650 Route des Lucioles—Sophia Antipolis, Valbonne, France; 38 pages.

International Search Report of the International Searching Authority, Application No. PCT/SE2014/050557, Sep. 8, 2014, 3 pp.

Written Opinion of the International Searching Authority, Application No. PCT/SE2014/050557, Sep. 8, 2014, 6 pp.

Written Opinion of the International Preliminary Examining Authority, Application No. PCT/SE2014/050557, Apr. 14, 2015, 7 pp.

International Preliminary Report on Patentability, Application No. PCT/SE2014/050557, Jul. 23, 2015, 15 pp.

First Office Action and English language translation, Chinese Patent Application No. 201480026533.5, Nov. 1, 2016.

* cited by examiner

1. UE has already one or several bearer setup for which radio resources might be provided by more than one eNB.

2. The anchor eNB configures the UE with multiple measurement reporting configurations that may be relevant to the triggering of selective handover 3. UE sends measurement reports when the reporting criteria are met 4. The anchor eNB provides the assisting eNB that should provide resources for the to be handed over existing or new UE bearer with the UE's current resource configuration and the limits within which the assisting node shall configure radio bearers for the UE, dependent on the UE's capability and probably further limitations the anchor node may provide 5. The assisting eNB reserves resources for the UE according to the information received from the anchor eNB and provides the configuration to the anchor eNB 6. The anchor eNB examines the provided configuration and might trigger a further re-iteration step with the assisting eNB (i.e. back to step 4).

7. The anchor eNB signals the radio resource reconfiguration to the UE.

Fig. 14

| IE/Group Name | Presence |
|---|---|
| Message Type | M |
| Old eNB UE X2AP ID | M |
| New eNB UE X2AP ID | M |
| E-RABs Admitted List | |
| > E-RABs Admitted Item | |
| >> E-RAB ID | M |
| >> UL GTP Tunnel Endpoint | O |
| >> DL GTP Tunnel Endpoint | O |
| E-RABs Not Admitted List | O |
| Target eNB To Source eNB Transparent Container | M |
| Criticality Diagnostics | O |

Fig. 15

BEARER CONFIGURATION SIGNALING

CROSS REFERENCE TO RELATED APPLICATION

This application is a 35 U.S.C. §371 national stage application of PCT International Application No. PCT/SE2014/050557, filed in the English language on 7 May 2014, which itself claims the benefit of U.S. Provisional Patent Application No. 61/822,189, filed 10 May 2013, the disclosures and contents of both of which are incorporated by reference herein in their entirety.

TECHNICAL FIELD

The present disclosure is directed to communications and, more particularly, to wireless communication methods, networks, and network nodes.

BACKGROUND

In a typical cellular radio system, wireless terminals (also referred to as user equipment unit nodes, UEs, mobile terminals, and/or mobile stations) communicate via a radio access network (RAN) with one or more core networks. The RAN covers a geographical area which is divided into cell areas, with each cell area being served by a radio base station (also referred to as a base station, a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

Cellular communications system operators have begun offering mobile broadband based on WCDMA (Wideband Code Division Multiple Access) and/or HSPA (High Speed Packet Access). Moreover, fuelled by introduction of new devices designed for data applications, end user performance requirements are steadily increasing. The increased adoption of mobile broadband has resulted in significant growth in traffic handled by HSPA networks. Accordingly, techniques that allow cellular operators to manage networks more efficiently may be desired.

Techniques to improve downlink performance may include 4-branch MIMO, multiflow communication, multi carrier deployment, etc. Since spectral efficiencies per link may be approaching theoretical limits, next steps may include improving spectral efficiencies per unit area. Further efficiencies for HSDPA may be achieved, for example, by changing a topology of traditional networks to provide increased uniformity of user experiences throughout a cell. Currently, heterogeneous networks are being developed for 3GPP as discussed, for example, in: RP-121436, Study on UMTS Heterogeneous Networks, TSG RAN Meeting #57, Chicago, USA, 4th-7th September 2012; R1-124512, Initial considerations on Heterogeneous Networks for UMTS, Ericsson, ST-Ericsson, 3GOO TSG RAN WG1 Meeting #70bis, San Diego, Calif., USA, 8th-12th Oct. 2012; and R1-124513, Heterogeneous Network Deployment Scenarios, Ericsson, ST-Ericsson, 3GPP TSG-RAN WG1 #70bis, San Diego, Calif., USA, 8th-12th Oct. 2012.

A homogeneous network is a network of base stations (also referred to as NodeB's) in a planned layout providing communications services for a collection of user terminals (also referred to as user equipment nodes, UEs, and/or wireless terminals) in which all base stations may have similar transmit power levels, antenna patterns, receiver noise floors, and/or backhaul connectivity to the data network. Moreover, all base stations in a homogeneous network may offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), Wimax (Worldwide Interoperability for Microwave Access), etc.

In a heterogeneous network, low power node base stations (also referred to as low power nodes, LPNs, micro nodes, pico nodes, femto nodes, relay nodes, remote radio unit nodes, RRU nodes, small cells, RRUs, etc.) may be deployed together with planned and/or regularly placed macro base stations, including macro base station MBS. Macro base station MBS may thus provide service over a relatively large macro cell area Mca, and each LPN may provide service for a respective relatively small LPN cell area Lca within the relatively large macro cell area Mca. Power transmitted by an LPN (e.g., 2 Watts) may be relatively small compared to power transmitted by a macro base station (e.g., 40 Watts for a typical macro base station). An LPN may be deployed, for example, to reduce/eliminate a coverage hole(s) in macro cell area Mca of macro base station MBS and/or to off-load traffic from macro base station MBS (e.g., to increase capacity in a high traffic location, also referred to as a hot-spot). Due to the lower transmit power and smaller physical size, an LPN may offer greater flexibility for site acquisition(s).

The increasing use of wireless communication as well as the increased performance requirements thereof calls for improvements in various aspects, such as e.g. the handling of connections between the UEs and the base stations, in particular dual connectivity wherein the UEs have simultaneous connections to several base stations.

SUMMARY

An object of the present disclosure is to solve or at least alleviate at least one of the above mentioned problems.

The object is according to a first aspect achieved by a method performed in a first network node for enabling dual connectivity for a communication device with the first network node and a second network node, wherein the communication device has at least one radio bearer set up with the first network node. The method comprises providing, to the second network node, a radio resource configuration request for the communication device and limits within which the second network node is to configure radio resources for the communication device, and receiving, from the second network node, a suggested radio resource configuration for the communication device.

The method enables allocation of resources for a new bearer to a communication device at an assisting network node and enables a bearer that needs to be handed over to an assisting network node to be within the limits of the communication devices' capabilities and/or according to what the first network node allows. Thereby it is avoided that such assisting network node would allocate resources that go beyond the communication devices' capabilities or outside limits that the first network node would allow, which would lead to faulty resource configuration at the communication device and hence to the inability to allocate resources at the assisting network node at all or even loss of the radio connection towards the communication device.

The object is according to a second aspect achieved by a first network node for enabling dual connectivity for a communication device with the first network node and a second network node, wherein the communication device has at least one radio bearer set up with the first network node. The first network node comprises a processor and memory, the memory containing instructions executable by the processor, whereby the first network node is operative to: provide, to the second network node, a radio resource configuration request for the communication device and limits within which the second network node is to configure radio resources for the communication device, and receive, from the second network node, a suggested radio resource configuration for the communication device.

The object is according to a third aspect achieved by a computer program for a first network node for enabling dual connectivity for a communication device with the first network node and a second network node, wherein the communication device has at least one radio bearer set up with the first network node. The computer program comprises computer program code, which, when run on the first network node causes the first network node to: provide, to the second network node, a radio resource configuration request for the communication device and limits within which the second network node is to configure radio resources for the communication device, and receive, from the second network node, a suggested radio resource configuration for the communication device.

The object is according to a fourth aspect achieved by a computer program product comprising a computer program as above, and a computer readable means on which the computer program is stored.

The object is according to a fifth aspect achieved by a method performed in a second network node for enabling dual connectivity for a communication device with a first network node and the second network node, wherein the communication device has at least one radio bearer set up at the first network node. The method comprises receiving, from the first network node, a radio resource configuration request for the communication device and limits within which to configure radio resources for the communication device; allocating radio resources for the communication device based on the received radio resource configuration request for the communication device and the limits, and sending a suggested radio resource configuration to the first network node.

The object is according to a sixth aspect achieved by a second network node for enabling dual connectivity for a communication device with a first network node and the second network node, wherein the communication device has at least one radio bearer set up at the first network node. The second network node comprises a processor and memory, the memory containing instructions executable by the processor, whereby the second network node is operative to receive, from the first network node, a radio resource configuration request for the communication device and limits within which to configure radio resources for the communication device; allocate resources for the communication device based on the received radio resource configuration request for the communication device and the limits, and send a suggested radio resource configuration to the first network node.

The object is according to a seventh aspect achieved by a computer program for a second network node for enabling dual connectivity for a communication device with a first network node and the second network node, wherein the communication device has at least one radio bearer set up at the first network node. The computer program comprises computer program code, which, when run on the second network node causes the second network node to receive, from the first network node, a radio resource configuration request for the communication device and limits within which to configure radio resources for the communication device; allocate resources for the communication device based on the received radio resource configuration request for the communication device and the limits, and send a suggested radio resource configuration to the first network node.

The object is according to an eight aspect achieved by a computer program product comprising a computer program as above, and a computer readable means on which the computer program is stored.

Further features and advantages of the present disclosure will become clear upon reading the following description and the accompanying drawings.

BRIEF DESCRIPTION OF THE DRAWINGS

FIG. 14 is a listing of operations according to some embodiments.

FIG. 15 is a table illustrating elements of an X2 handover request acknowledge message.

DETAILED DESCRIPTION

Figure 1:
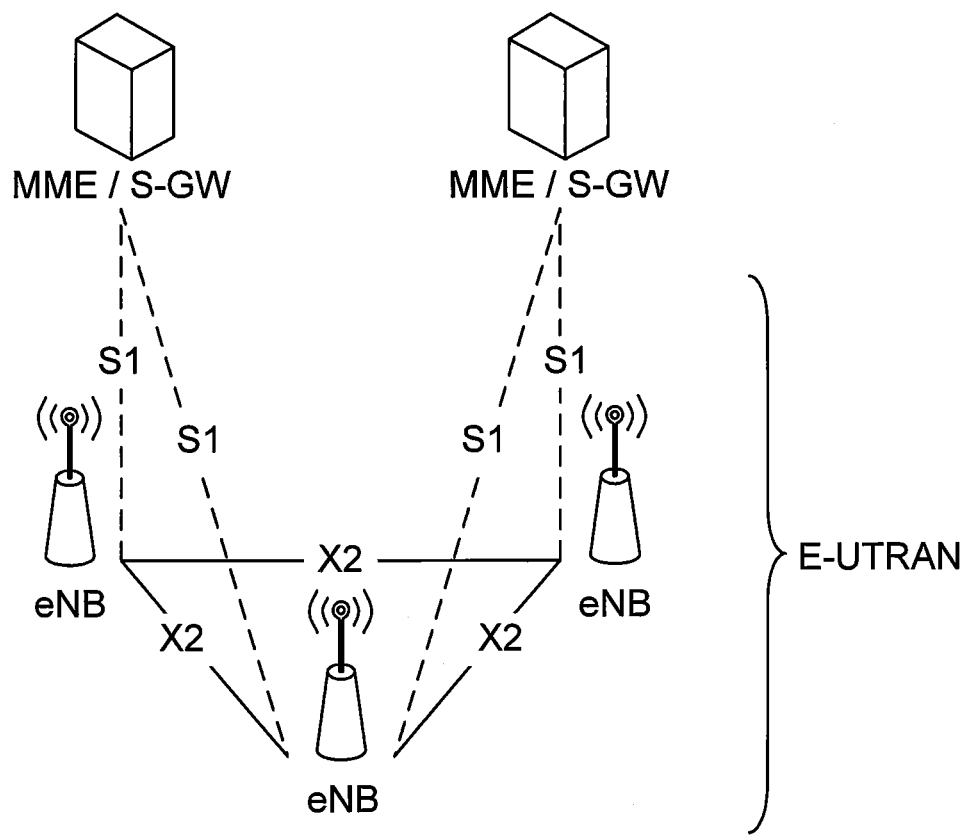
FIG. 1 is a schematic/block diagram illustrating overall E-UTRAN architectures according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a Radio Access Network (RAN) that communicates over radio communication channels with wireless terminals (also referred to as UEs). It will be understood, however, that present inventive concepts are not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from WCDMA and/or HSPA is used in this disclosure to exemplify embodiments of the inventive concepts, this should not be seen as limiting the scope of inventive concepts to only these systems. Other wireless systems, including 3GPP (3rd Generation Partnership Project) LTE (Long Term Evolution), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of inventive concepts may also be applied, for example, in an uplink. Furthermore, although the description below focuses, for purposes of illustration, on example embodiments in which described solutions are applied in heterogeneous networks that include a mix of relatively higher-power (e.g., "macro") base stations and relatively lower-power node (e.g., "pico") base stations, the described techniques may be applied in any suitable type of network, including both homogeneous and heterogeneous configurations. Thus, the base stations involved in the described configurations may be similar/identical to one another, or may differ in terms of transmission power, number of transmitter-receiver antennas, processing power, receiver and transmitter characteristics, and/or any other functional or physical capability.

With the proliferation of user friendly smart phones and tablets, the usage of high data rate services such as video streaming over the mobile network is becoming commonplace, greatly increasing the amount of traffic in mobile networks. Thus, there is a great urgency in the mobile network community to ensure that the capacity of mobile networks keeps up increasing with this ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional preplanned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11, and several low-powered base stations to realize heterogeneous networks such as pico base stations, femto base stations (also known as home base stations or HeNBs), relays, and RRHs (remote radio heads) have been defined.

Initial discussions for LTE release 12 have already started and one of the proposed items for study is the possibility of serving a User Equipment node (also referred to as a UE, a wireless terminal, etc.) from more than one eNB (also referred to as a base station) simultaneously. The current legacy handover mechanisms of LTE may have to be updated to support this.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. The overall E-UTRAN architecture is illustrated in FIG. 1, indicating e.g. the S1 and X2 interfaces.

Figure 2:
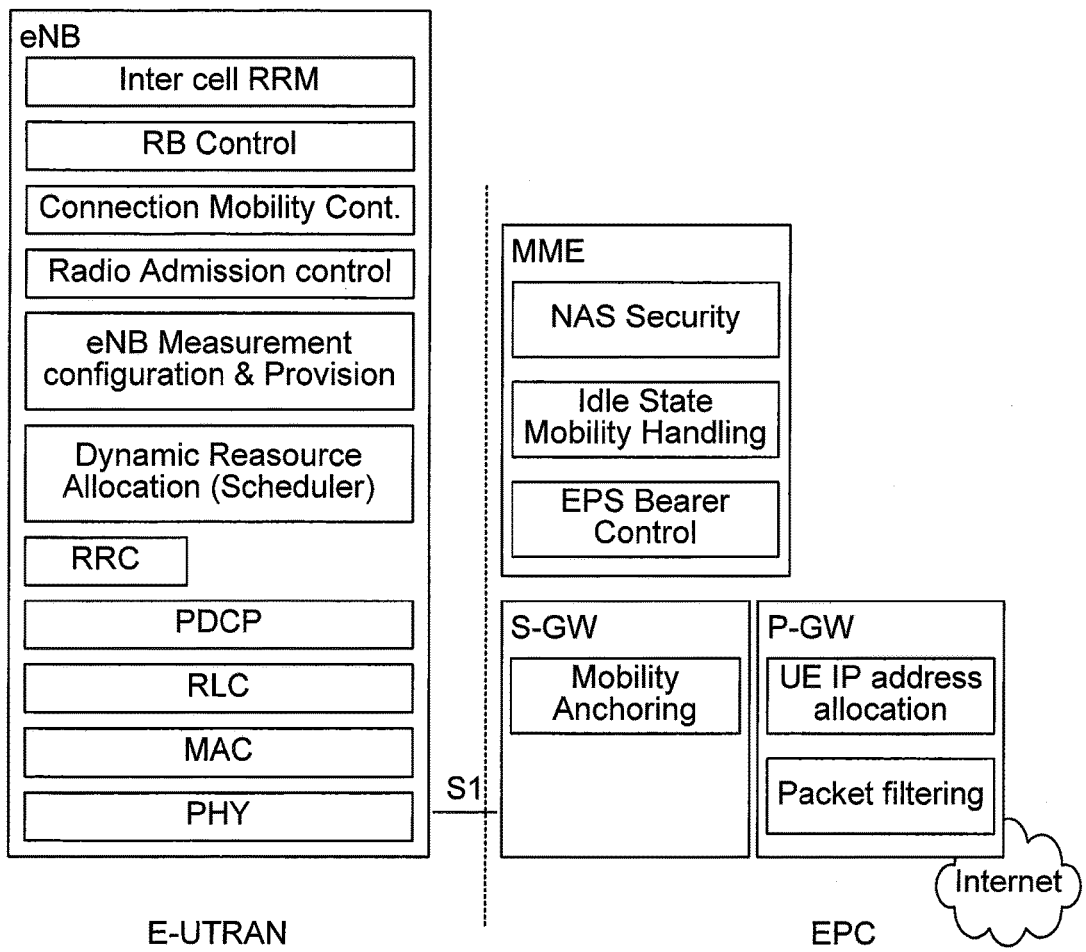
FIG. 2 is a block diagram illustrating a functional split between E-UTRAN and EPC according to some embodiments.

The eNB hosts functionalities such as Radio Resource Management (RRM), radio bearer control, admission control, header compression of user plane data towards serving gateway, and/or routing of user plane data towards the serving gateway. The MME is the control node that processes the signaling between the UE and the CN (core network). Significant functions of the MME are related to connection management and bearer management, which are handled via Non Access Stratum (NAS) protocols. The S-GW is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW) is the node responsible for UE IP address allocation, as well as Quality of Service (QoS) enforcement (as further discussed below). FIG. 2 illustrates a summary of functionalities of the different nodes, and the reader is referred to 3GPP TS 36.300 and the references therein for further details of functionalities of the different nodes. In FIG. 2, blocks eNB, MMe, S-GW, and P-GW illustrate logical nodes; blocks Inter Cell RRM, RB Control, Connection Mobility Cont., Radio Admission Control, eNB Measurement Configuration & Provision, Dynamic Resource Allocation (Scheduler), NAS Security, Idle State Mobility Handling, EPS bearer Control, Mobility Anchoring, UE IP address allocation, and Packet Filtering illustrate functional entities of the control plane; and blocks RRC, PDCP, RLC, MAC, and PHY illustrate the radio protocol layers.

The radio protocol architecture of E-UTRAN is divided into the user plane and the control plane.

Figure 3:
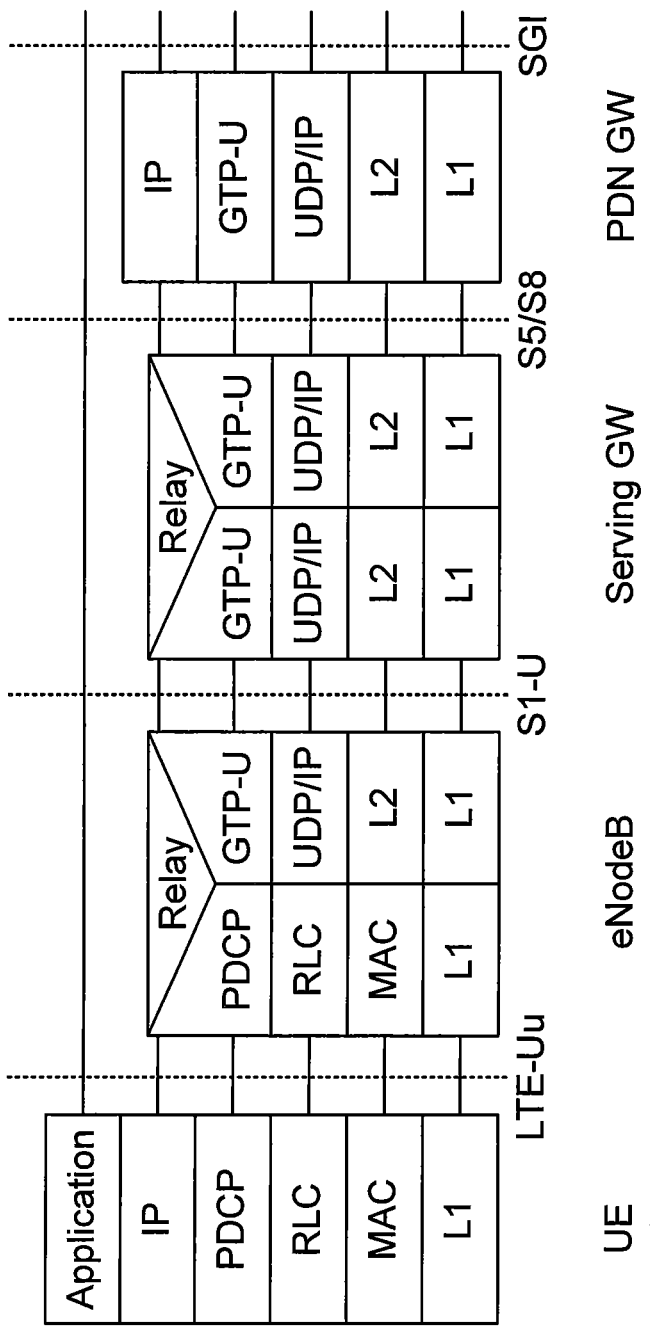
FIG. 3 is a schematic diagram illustrating a user plane protocol stack according to some embodiments.

FIG. 3 illustrates the protocol stack for the user-plane. The user plane protocol stack includes the Packet Data Convergence Protocol (PDCP), Radio Link Control (RLC), and Medium Access Control (MAC), which are terminated at the eNB. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS (Quality of Service) of each radio bearer and the current capacity available to the UE.

Figure 4:
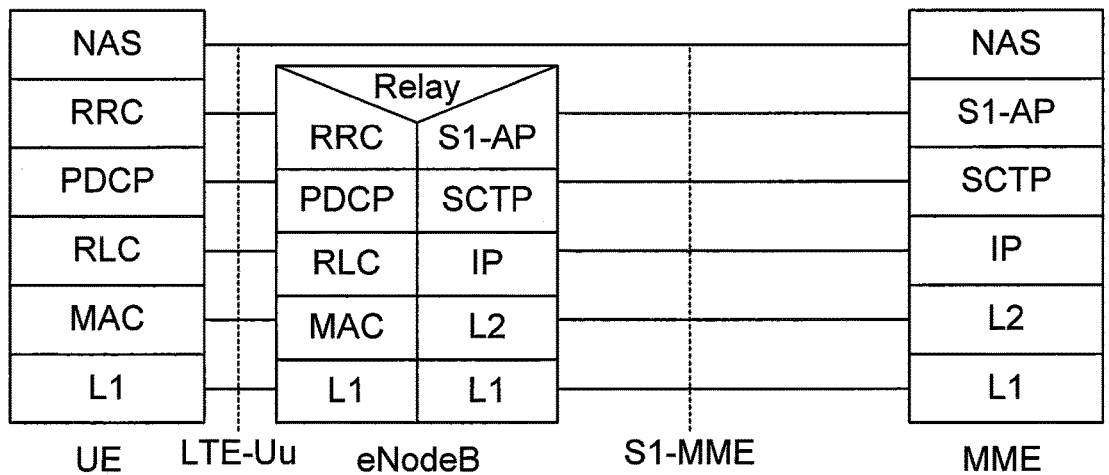
FIG. 4 is a schematic diagram illustrating a control plane protocol stack according to some embodiments.

FIG. 4 illustrates the control plane protocol stack. The layers below the Radio Resource Control (RRC) layer perform the same functionality as in the user plane except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. Details of the RRC protocol functionalities and procedures can be found in 3GPP TS 36.331.

A UE is uniquely identified over the S1 interface within an eNB with the eNB UE S1AP ID. When an MME receives an eNB UE S1AP ID, the MME stores it for the duration of the UE-associated logical S1-connection for this UE. Once known to an MME, this IE (information element) is included in all UE associated S1-AP signaling. The eNB UE S1AP ID is unique within the eNB, and a UE is assigned a new S1AP ID after a handover by the target eNB.

From the MME side, a UE is uniquely identified using the MME UE S1AP ID. When an eNB receives MME UE S1AP ID, the eNB stores it for the duration of the UE-associated logical S1 connection for this UE. Once known to an eNB, this IE is included in all UE associated S1-AP signaling. The MME UE S1AP ID is unique within the MME, and it is changed if the UE's MME changes (for example, handover between two eNBs connected to different MMEs).

Figure 5:
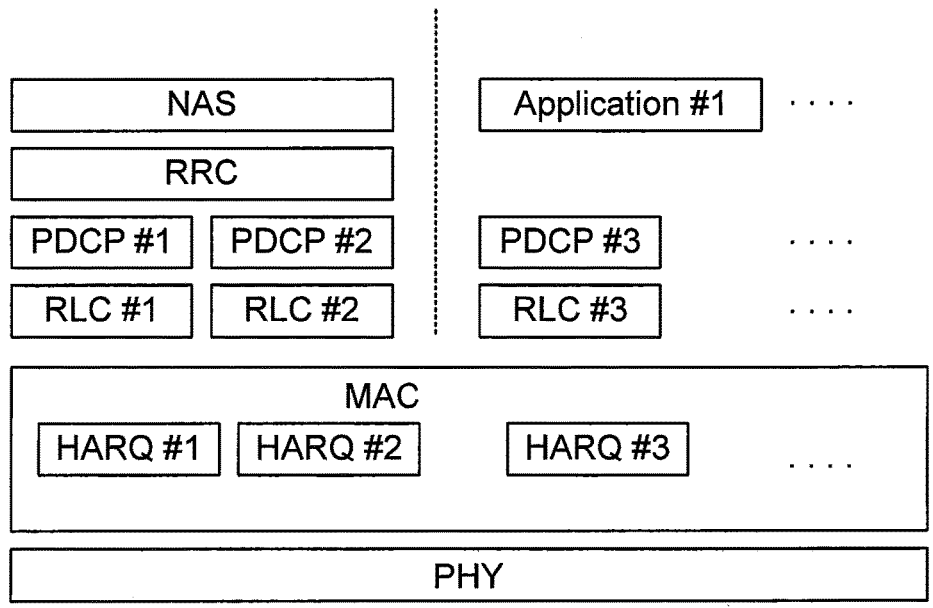
FIG. 5 is a block diagram illustrating user plane and control plane data flows according to some embodiments.

The flow of user plane and control plane data is illustrated in FIG. 5. There is only one MAC entity per UE (unless the UE supports multiple carriers in the case of carrier aggregation) and under this MAC entity, several Hybrid ARQ (HARQ) processes might be running simultaneously for rapid retransmissions. There is a separate RLC entity for each radio bearer and if the radio bearer is configured to use PDCP, there is also one separate PDCP entity for that bearer. A bearer is configured to use PDCP only if it is dedicated to a UE (i.e., multicast and broadcast data do not utilize PDCP both in the control and user plane and the PDCP is used only for dedicated control message in the control plane and for dedicated UL/DL data in the user plane).

At the transmitting side each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed (i.e., each layer passing SDUs to the layer above it, where they are perceived as PDUs).

A UE can have multiple applications running at the same time, each having different QoS (Quality of Service) requirements (for example, VoIP, browsing, file download, etc.). To support these different requirements, different bearers are set up, each being associated with a respective QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g. scheduling policy, queue management policy, rate shaping policy, RLC configuration, etc.).

One EPS bearer/E-RAB is established when the UE connects to a PDN (Packet Data Network), and that remains established throughout the lifetime of the PDN connection to provide the UE with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer can only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer can either be a GBR or a Non-GBR bearer while a default bearer shall be a Non-GBR bearer.

Figure 6:
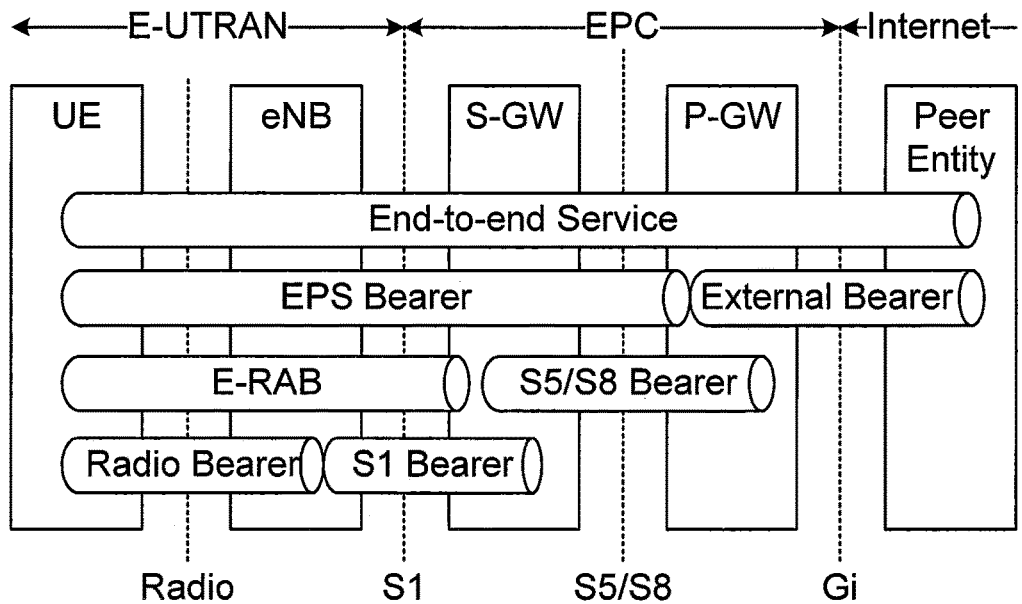
FIG. 6 is a schematic diagram illustrating EPS bearer service architectures according to some embodiments.

The EPS bearer service architecture is shown in FIG. 6. The packets of an EPS bearer are transported over a radio bearer between the UE and eNB. An S1 bearer transports the packets of an EPS bearer between the eNB and S-GW. An E-RAB is actually a concatenation of these two bearers (i.e., radio bearer and S1 bearer), and the two bearers are mapped on a one to one fashion. An S5/S8 bearer transports the packets of the EPS bearer between the S-GW and P-GW, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters:

QoS Class Identifier (QCI): scalar that is used as a reference to access node-specific parameters that control bearer level packet forwarding treatment (e.g. scheduling weights, admission thresholds, queue management thresholds, link layer protocol configuration, etc.), and that have been pre-configured by the operator owning the eNodeB. Nine QCI values are standardized the detailed requirements of these classes can be found in 3GPP TS 23.203.

Allocation and Retention Priority (ARP): the primary purpose of ARP is to decide whether a bearer establishment/modification request can be accepted or needs to be rejected in case of resource limitations. In addition, the ARP can be used by the eNodeB to decide which bearer(s) to drop during exceptional resource limitations (e.g. at handover).

Each GBR bearer may be additionally associated with the following bearer level QoS parameters:

Guaranteed Bit Rate (GBR): the bit rate that can be expected to be provided by a GBR bearer.

Maximum Bit Rate (MBR): the maximum bit rate that can be expected to be provided by a GBR bearer. MBR can be greater or equal to the GBR.

Each Access Point Name (APN) access, by a UE, is associated with a per-APN Aggregate Maximum Bit Rate (APN-AMBR). The APN-AMBR sets the limit on the aggregate bit rate that can be expected to be provided across all Non GBR bearers and across all PDN connections of the same APN.

Each UE in state EMM-REGISTERED is associated with the bearer aggregate level QoS parameter known as per UE Aggregate Maximum Bit Rate (UE-AMBR). The UE AMBR limits the aggregate bit rate that can be expected to be provided across all Non GBR bearers of a UE.

Heterogeneous Networks and Soft/Shared Cells

Figure 7:
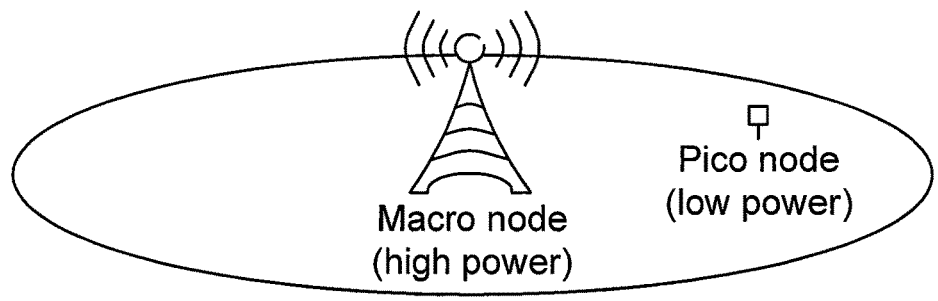
FIG. 7 is a schematic diagram illustrating a heterogeneous deployment with a higher-power macro node and a lower-power pico node according to some embodiments.

A heterogeneous deployment or heterogeneous network, as illustrated in FIG. 7, includes network transmission nodes (e.g., micro and pico nodes or base stations) operating with different transmit powers and with overlapping coverage areas. A heterogeneous deployment/network is considered as an interesting deployment strategy for cellular networks. In such a deployment, the low-power nodes ("pico nodes") are typically assumed to offer high data rates (Mbit/s) and/or to provide increased/high capacity (users/m2 or Mbit/s/m2) in the local areas where increased data rates/capacity is/are needed/desired, while the high-power nodes ("macro nodes") are assumed to provide full-area coverage. In practice, the macro nodes may correspond to currently deployed macro cells while the pico nodes are later deployed nodes, provided to extend capacity and/or achievable data rates within the macro-cell coverage area where needed/desired. FIG. 7 illustrates a heterogeneous deployment with a higher-power macro node and a lower-power pico node. In a typical case, there may be multiple pico nodes within the coverage area of a macro node.

Figure 8:
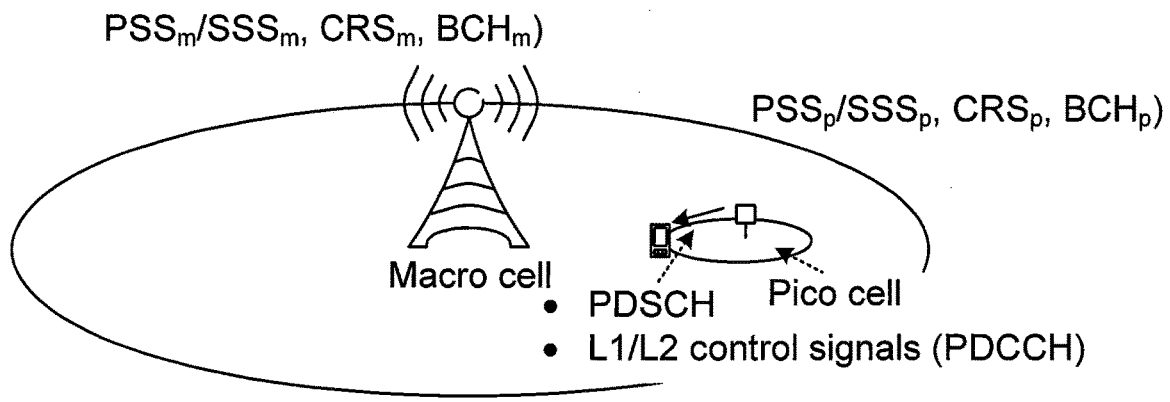
FIG. 8 is a schematic diagram illustrating a heterogeneous deployment where the pico node corresponds to a cell of its own (a "pico cell") according to some embodiments. The indices "p" and "m" indicate common signals/channels for the pico and macro cell respectively.

A pico node of a heterogeneous deployment may operate as a cell of its own (a "pico cell") as shown in FIG. 8. This means that, in addition to downlink and uplink data transmission/reception, the pico node also transmits the full set of common signals/channels associated with a cell. In the LTE context this full set of common signals/channels includes:

The Primary and Secondary Synchronization Signals (PSS and SSS) corresponding to the Physical Cell Identity of the pico cell.

The Cell-specific reference signals (CRS), also corresponding to the Physical Cell Identity of the cell. The CRS can, for example, be used for downlink channel estimation to enable coherent demodulation of downlink transmissions.

The Broadcast channel (BCH), with corresponding pico-cell system information. Additional system information may also be transmitted on the PDSCH physical channel.

As the pico node transmits the common signals/channels, the corresponding pico cell can be detected and selected (connected to) by a terminal (UE, user equipment).

If the pico node corresponds to a cell of its own, also so-called L1/L2 control signaling on the Physical Downlink Control Channel of PDCCH (as well as Physical Control Format Indicator Channel or PCFICH and Physical Hybrid-ARQ Indicator Channel or PHICH) are transmitted from the pico node to connected terminals, in addition to downlink data transmission on the Physical Downlink Shared Channel or PDSCH. The L1/L2 control signaling, for example, provides downlink and uplink scheduling information and Hybrid-ARQ-related information to terminals within the cell. This is shown in FIG. 8.

FIG. 8 illustrates a heterogeneous deployment where the pico node corresponds to a cell of its own (a "pico cell"). The indices "p" and "m" indicate common signals/channels for the pico and macro cell respectively. As shown in FIG. 8, the pico node uses/transmits its own primary and secondary synchronization signals $PSS_p$ and $SSS_p$, cell specific reference signals $CRS_p$, and broadcast channel $BCH_p$ that are independent of (e.g., different than) the primary and secondary synchronization signals $PSS_m$ and $SSS_m$, cell specific reference signals CRSm, and broadcast channel BCHm used/transmitted by the macro node. Accordingly, the UE may communicate through the pico node without support from the macro node.

Figure 9:
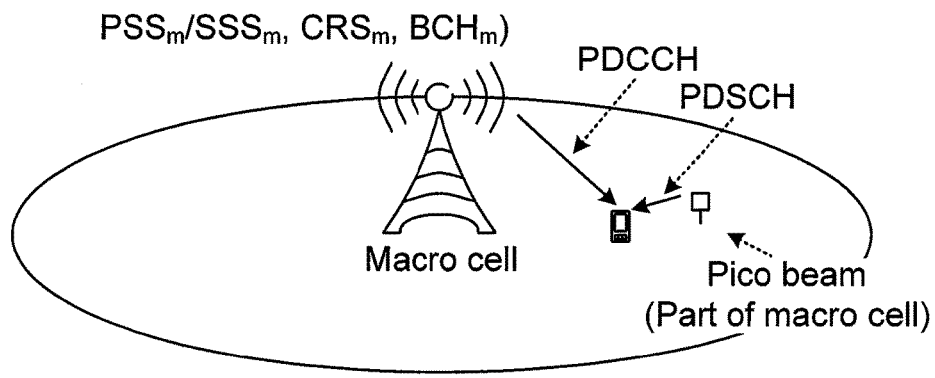
FIG. 9 is a schematic diagram illustrating a heterogeneous deployment where the pico node does not correspond to a cell of its own according to some embodiments.

Alternatively, a pico node within a heterogeneous deployment may not correspond to a separate cell of its own, but may instead provide a data-rate and/or capacity "extension" of the overlaid macro cell. This is sometimes known as "shared cell" or "soft cell". In this case, at least the CRS, PBCH (physical broadcast channel), PSS and SSS are transmitted from the macro node (but not the pico node). The PDSCH (physical downlink shared channel) can be transmitted from the pico node. To allow for demodulation and detection of the PDSCH, despite the fact that no CRS is transmitted from the pico node, DM-RS (downlink modulation reference signal) may be transmitted from the pico node together with the PDSCH. The UE-specific reference signals can then be used by the terminal for PDSCH demodulation/detection. This is shown in FIG. 9 which illustrates a heterogeneous deployment where the pico node does not correspond to or define a cell of its own.

Figure 10:
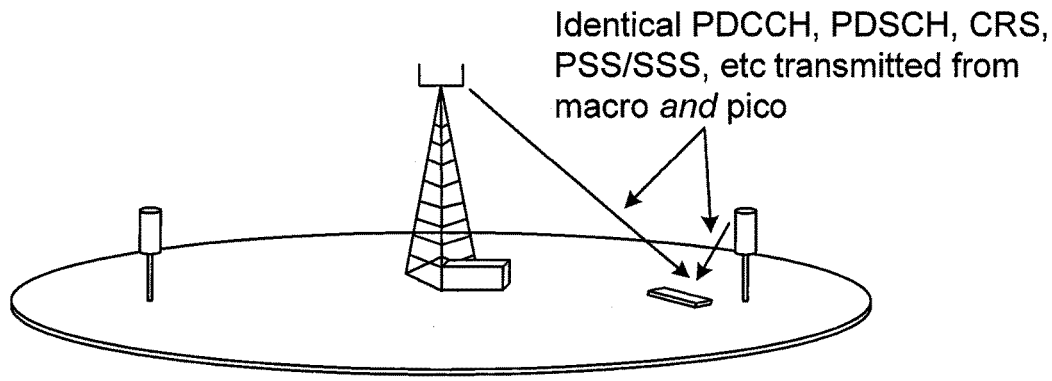
FIG. 10 is a schematic diagram illustrating SFN operation with identical transmission from macro and picon nodes to a wireless terminal according to some embodiments.

Transmitting data from a pico node not transmitting CRS as described above may require DM-RS support in/at the wireless terminal UE ("non-legacy terminal"). In LTE, DM-RS-based PDSCH reception is supported in Rel-10 and for FDD while for the L1/L2 control signaling, DM-RS-based reception is planned for Rel-11. For terminals not supporting DM-RS-based reception ("legacy terminals") one possibility in a shared cell setting is to exploit SFN-type (Single Frequency Network type) of transmission. In essence identical copies of the signals and channels necessary for a legacy terminal are transmitted simultaneously from the macro and pico nodes. From a terminal perspective, this will look as a single transmission. Such an operation, which is illustrated in FIG. 10, may only provide an SINR gain, which can be translated into a higher data rate but not a capacity improvement, because transmission resources cannot be reused across sites within the same cell. As shown in FIG. 10, SFN operation may be provided with identical transmissions from macro and pico to a wireless terminal UE.

Figure 11:
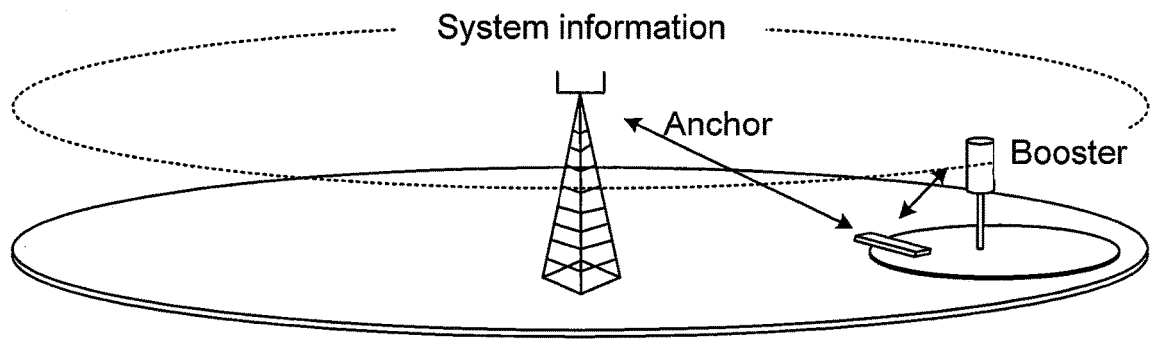
FIG. 11 is a schematic diagram illustrating soft cell operation with the UE (wireless terminal) having multiple connections with both the anchor (macro) and booster (pico) nodes according to some embodiments.

Assume that the macro nodes are able to provide coverage and the pico nodes are provided only for capacity enhancements (i.e., to reduce coverage holes), another alternative architecture is where the UE maintains the macro node connectivity all the time (called the "anchor" link), and adds the pico node connectivity when it is in the coverage area of the pico node (also referred to as the "booster" link). When both connections are active, the anchor link can be used for control signaling while the booster link is used for data. In addition, it may also be possible to send data via the anchor link. This is illustrated in FIG. 11. In this case, as in the previous cases, the system information is shown to be sent only from the macro node, but it is still possible to send it also from the pico node. As shown in FIG. 11, in soft cell operation, the UE may have multiple connections with both the anchor and booster nodes (also referred to as the macro and pico nodes).

Protocol Architecture for Soft Cells

Figure 12:
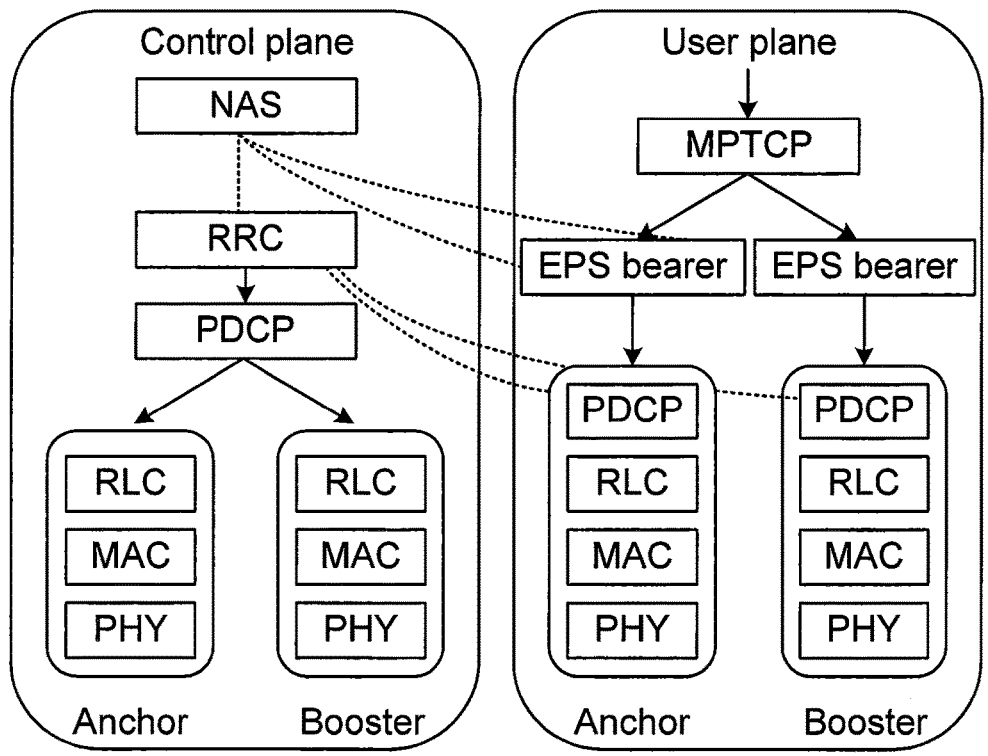
FIG. 12 is a block diagram illustrating a protocol architecture for multiple connectivity according to some embodiments.

To support multiple connectivity to micro and pico nodes, several architectural options are possible both for the control and user planes. For the user plane, a centralized approach may be provided where the PDCP (or even the RLC) is terminated at the anchor node only and the booster node terminates at the RLC (or even the MAC) level. A decentralized approach may be to have the booster to terminate at the PDCP level. A similar approach can be taken in the control plane (i.e., distributed or centralized PDCP/RLC) but on top of that the additional dimension of centralizing or distributing the RRC may be provided. FIG. 12 shows example control and user plane architectures, where the user plane uses distributed PDCP, while the control plane is centralized at the PDCP level at the anchor node. Note that in FIG. 12, user plane aggregation (i.e., the possibility to split the packets belonging to one application data flow over the anchor and booster links) can be realized by using a higher layer aggregation protocol like multi-path TCP (MTCP).

Wireless terminals (UEs) can be configured to report measurements, mainly for the sake of supporting mobility. As specified in 3GPP TS 36.331, the E-UTRAN provides the measurement configuration applicable for a UE in RRC_CONNECTED using dedicated signaling (i.e. using the RRCConnectionReconfiguration message). The following measurement configurations can be signaled to the UE:

1. Measurement objects: These define on what the UE should perform the measurements—such as a carrier frequency. The measurement object may also include a list of cells to be considered (white-list or black-list) as well as associated parameters, for example, frequency- or cell-specific offsets.

2. Reporting configurations: These include the periodic or event-triggered criteria which cause the UE to send a measurement report, as well as the details of what information the UE is expected to report (e.g. the quantities, such as Received Signal Code Power (RSCP) for UMTS or Reference Signal Received Power (RSRP) for LTE, and the number of cells).

3. Measurement identities: These identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

4. Quantity configurations: The quantity configuration defines the filtering to be used on each measurement. One quantity configuration is configured per RAT (Radio Access Technology) type, and one filter can be configured per measurement quantity.

5. Measurement gaps: Measurement gaps define time periods when no uplink or downlink transmissions will be scheduled, so that the UE may perform the measurements (e.g., inter-frequency measurements where the UE has only one Tx/Rx transmitter/receiver unit and supports only one frequency at a time). The measurement gaps are common for all gap-assisted measurements The E-UTRAN configures only a single measurement object for a given frequency, but more than one measurement identity may use the same measurement object. The identifiers used for the measurement object and reporting configuration are unique across all measurement types. It is possible to configure the quantity which triggers the report (RSCP or RSRP) for each reporting configuration.

In LTE, the most important measurements metric used are the Reference Signal Received Power (RSRP) and Reference Signal Received Quality (RSRQ). RSRP is a cell specific measure of signal strength and it is mainly used to rank different cells for handover and cell reselection purposes, and it is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that UEs receive from their serving eNBs is the S-measure, which tells the UE when to start measuring neighboring cells. If the measured RSRP of the serving cell falls below the S-measure, indicating the signal of the serving cell is not that strong anymore, the UE starts measuring the signal strength of RSs from the neighboring cells. The S-measure is an optional parameter and different S-measure values can be specified to initiate intra-frequency, inter-frequency and inter-RAT measurements. Once the UE is enabled for measuring, it can report any of the following:

The serving cell;

Listed cells (i.e. cells indicated as part of the measurement object); and/or

Detected cells on a listed frequency (i.e. cells which are not listed cells but are detected by the UE).

There are several measurement configuration parameters that specify the triggering of measurement reports from the UE. The following event-triggered criteria are specified for intra-RAT measurement reporting in LTE:

Event A1: Primary serving cell (PCell) becomes better than absolute threshold.

Event A2: PCell becomes worse than absolute threshold.

Event A3: Neighbor cell becomes better than an offset relative to the PCell.

Event A4: Neighbor cell becomes better than absolute threshold.

Event A5: PCell becomes worse than one absolute threshold and neighbor cell becomes better than another absolute threshold.

Event A6: Neighbor cell becomes better than an offset relative to a secondary cell (SCell)

For inter-RAT mobility, the following event-triggered reporting criteria are specified:

Event B1: Neighbor cell becomes better than absolute threshold.

Event B2: Serving cell becomes worse than one absolute threshold and neighbor cell becomes better than another absolute threshold.

Figure 13:
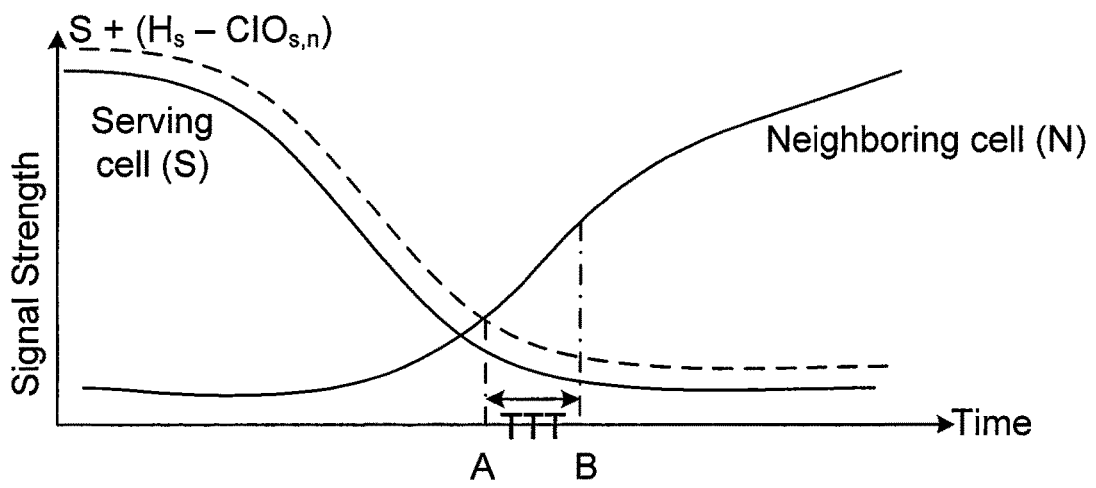
FIG. 13 is a graph illustrating handover triggering in LTE according to some embodiments.

The most important measurement report triggering event related to handover may be A3, and its usage is illustrated in the graph of FIG. 13. The triggering conditions for event A3 can be formulated as:

$$N > S + HOM \quad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ (see 36.133 for further explanation).

The UE triggers the intra-frequency handover procedure by sending event A3 report to the eNB. This event occurs when the UE measures that the target cell is better than the serving cell with a margin "HOM". The UE is configured over RRC when entering a cell and the HOM is calculated from the following configurable parameters:

$$HOM = Ofs + Ocs + Off - Ofn - Ocn + Hys$$

Where:

$Ofs$ is the frequency specific offset of the serving cell
$Ocs$ is the cell specific offset (CIO) of the serving cell
$Off$ is the a3-Offset
$Ofn$ is the frequency specific offset of the neighbor cell
$Ocn$ is the CIO of the neighbor cell
$Hys$ is the hysteresis If the condition of Equation 1 (N>S+HOM) is satisfied and it remains valid for a certain duration known as Time To Trigger (TTT), the UE sends a measurement report to the serving eNB (in FIG. 13, event A3 is satisfied at point A and a measurement report is sent at point B in time). When the serving eNB receives the measurement report, the serving eNB can initiate a handover of communications for the UE towards the neighbor.

In addition to event-triggered reporting, the UE may be configured to perform periodic measurement reporting. In this case, the same parameters may be configured as for event-triggered reporting, except that the UE starts reporting immediately rather than only after the occurrence of an event.

Handover is an important aspect of any mobile communication system, where the system tries to assure service continuity of the User Equipment (UE) by transferring the connection from one cell to another depending on several factors such as signal strength, load conditions, service requirements, etc. The provision of efficient/effective handovers (minimum number of unnecessary handovers, minimum number of handover failures, minimum handover delay, etc.), may affect not only the Quality of Service (QoS) of the end user but also the overall mobile network capacity and performance.

In LTE, UE-assisted, network controlled handover is used (3GPP TS 36.300). The handover is based on UE reports, and the UE is moved, if required and possible, to the most appropriate cell that will assure service continuity and quality.

Handover is performed via the X2 connection, whenever available, and if not, using S1 (i.e. involving the Core Network (CN)). For the X2 Handover process reference is made e.g. to relevant technical specifications. The handover procedure can be sub-divided into three stages of preparation (initiation), execution, and completion.

During the preparation stage, based on the measurement results the source eNB is receiving from the UE, the source eNB decides whether to handover the connection to another eNB or not. If the decision is to handover, the source eNB sends a HANDOVER REQUEST message to the target eNB. The source eNB must indicate the cause of the HO in this message, which can be, for example, (1) Handover Desirable for Radio Reasons, (2) Resource Optimization Handover, or (3) Reduce Load in Serving Cell.

Accordingly, the target eNB knows if the HO is due to resource optimization or to reduce the load in the serving cell. If the target eNB is able to admit the UE, a message is sent to the UE to initiate the handover, and the handover execution state is entered. DL (downlink) data packets arriving at the source eNB for the UE are then forwarded to the new target eNB.

The handover completion stage is entered once the target eNB and the UE are synchronized and a handover confirm message is received by the target eNB. After a proper setup of the connection with the target eNB is performed (which includes the switching of the DL path in the serving gateway), the old connection is released and any remaining data in the source eNB that is destined for the UE is forwarded to the target eNB. Then normal packet flow can ensue through the target eNB.

LTE currently supports only one to one connections between UEs and eNBs. As such, when a handover is initiated, the target is asked to admit all the bearers of the UE. In LTE RRM is completely distributed among the eNBs, so that each node handles especially Radio Admission Control and Radio Bearer Control on its own.

If now more than one node is involved in the provision of radio resources to the UE, the admission and configuration of radio resources would need to be handled in an independent way by each involved eNB on its own. Otherwise, the anchor eNB would need to directly control the usage of radio resources at the assisting eNB. As both anchor and assisting eNB should be able to operate in single radio mode as well (where radio resources are controlled by a single node only) and could assume different roles to different UEs, the independence of each eNB in admitting, configuring and controlling radio resources should be retained.

By this, the assisting eNB may need to have additional information of the UE's current radio resource usage to assess a bearer configuration that the UE is able to support.

In some embodiments of inventive concepts, mechanisms are proposed to enable the setup or handover of a UE bearer for which radio resources are provided by a radio network node (the assisting node) that is different from the radio network node (anchor node) that hosts the RRC connection and the connection to the core network.

It is proposed to provide the assisting radio network node from the anchor radio network node with the UE's current resource configuration and the limits within which the assisting node shall configure radio bearers, dependent on the UE's capability and probably further limitations that the anchor node may provide.

The assisting node shall provide the radio resource configuration of the radio resources it controls to the anchor node. If the anchor node would need to further modify the assisting node's choice, yet another negotiation between the anchor and the assisting node may take place.

The actual trigger of such a bearer setup or handover is out of scope of the present disclosure.

General principles according to some embodiments of inventive concepts are illustrated in FIG. 14 and discussed below:

1. UE has already one or several bearer setup for which radio resources might be provided by more than one eNB. For example, the UE may have one or more bearer setup by a first network node (anchor network node in the following denoted anchor eNB), e.g. comprising a voice bearer and a data bearer. 2. The anchor eNB configures the UE with multiple measurement reporting configurations that may be relevant to the triggering of selective handover. For example, the anchor eNB might be highly loaded, reaching its capacity limit, and would need to move a data bearer to a second network node (assisting network node, in the following denoted assisting eNB); i.e. selective handover of a bearer. As explained earlier, each involved eNB would need to handle configuration of radio resources in an independent way on its own, and there is therefore no prior art solution for performing such selective handover and dual connectivity (i.e. UE connected to the two eNBs, which both handle their respective resources independently).

3. UE sends measurement reports when the reporting criteria are met. For example, the UE might receive signaling from a (potential) assisting node and report this to the anchor eNB. A selective handover of a bearer, or set-up of a new bearer, with the aid of the assisting eNB could then be advantageous e.g. from both network utilization perspective and from user experience perspective.

4. The anchor eNB provides the assisting eNB that should provide resources to be handed over existing or new UE bearer with the UE's current resource configuration and the limits within which the assisting node shall configure radio bearers for the UE, dependent on the UE's capability and probably further limitations the anchor node may provide. The present disclosure thus enables, in an aspect, a collaboration between the eNBs regarding their respective available resources. The anchor eNB may provide the assisting eNB with a current configuration of the UE (i.e. configuration of UE before entering dual connectivity with both eNBs), or with a target configuration (i.e. a desired configuration of the UE after having entered the dual connectivity). In addition or alternatively, the anchor eNB may provide the assisting eNB with information about the UE capabilities, which is thus one way to signal the limits within which the assisting eNB may select a suggested configuration. The prior art shortcomings of lack of means for shared resource handling in the eNBs is thereby overcome, i.e. a solution is provided for handling the resource sharing between eNBs needing coordination in order e.g. to keep within the UE capabilities.

5. The assisting eNB reserves resources for the UE according to the information received from the anchor eNB and provides the configuration to the anchor eNB. For example, the anchor eNB may want to hand over a data bearer for which resources are currently provided by the anchor eNB (e.g. based on the measurement reports received from the UE and/or based on network planning) but for which resources would preferably be provided by the assisting eNB instead. The assisting eNB may thus select a configuration for the UE, the configuration comprising suggested resources to be provided by the assisting eNB.

6. The anchor eNB examines the provided configuration and might trigger a further re-iteration step with the assisting eNB (i.e. back to operation 4). The anchor eNB might have information about the capabilities of the UE, and if for example, the assisting eNB suggests resources going beyond these capabilities, the anchor eNB may provide a new resource configuration to the assisting eNB taking into account e.g. limitations provided by the assisting eNB.

7. The anchor eNB signals the radio resource reconfiguration to the UE. Once the anchor eNB and the assisting eNB have agreed on a UE radio resource configuration to use, the UE should be reconfigured accordingly. It is preferably the anchor eNB that signals the agreed upon radio resource reconfiguration to the UE. It is noted that the configuration that the assisting eNB creates may also be transparently forwarded to the UE by the anchor eNB together with the anchor eNBs' configuration for the UE. A particular example could be that the anchor eNB keeps a voice bearer and control bearer, and hands over an existing data bearer to the assisting eNB (or a new data bearer is set up at the assisting eNB). The assisting eNB then handles the data bearer using the agreed upon radio resources.

Embodiment of inventive concepts are shown in FIG. 14. Further details of inventive concepts are discussed below. For the sake of brevity, the descriptions below treat only the case of dual connectivity with two eNBs, one anchor and one assisting eNB but the concepts are equally applicable for the case where the UE is connected to more than two eNBs at the same time.

The assumed signaling for selectively handing over or setting up a bearer at the assisting eNB (that could take place on the already existing X2 interface or on a new interface) may need to carry in the X2 message that requests the handover or setup, information about the radio configuration. Here it is assumed that the same principle as currently used in legacy X2/S1 handover can be reused. In legacy systems, a transparent container is used in the Handover Request Acknowledgement message to signal the configuration from the target eNB, via the source eNB to the UE, see table 1 (FIG. 15). Transparent here refers to the X2 interface (i.e., the contents of the container is transparent to the X2 interface), and any changes within do not require a change in the X2 interface.

FIG. 15 is a table illustrating an X2 HANDOVER REQUEST ACKNOWLEDGE message. Information of FIG. 15 is also reproduced below (refer also to TS 36.423, chapter 9.1.1.2).

| IE/Group Name | Presence |
|---|---|
| Message Type | M |
| Old eNB UE X2AP ID | M |
| New eNB UE X2AP ID | M |
| E-RABs Admitted List | |
| > E-RABs Admitted Item | |
| >> E-RAB ID | M |
| >> UL GTP Tunnel Endpoint | O |
| >> DL GTP Tunnel Endpoint | O |
| E-RABs Not Admitted List | O |
| Target eNB To Source eNB Transparent Container | M |
| Criticality Diagnostics | O |

Similar to normal X2/S1 handover where the target node provides the radio configuration in the target cell to the source node in the transparent container described above, the assisting eNB would provide the bearer configuration of the new or to be handed over UE bearers to the anchor eNB. The anchor eNB would check if the assisting eNB allocated resources according to the information provided. If this is not the case, the anchor eNB could either repeat the procedure or cancel the HO/bearer setup.

If a HO would involve a target anchor and a target assisting eNB, the source anchor eNB may need to provide respective information to both nodes and assess the to be expected bearer configuration at the target cells all together.

Also, if a HO from a dual connectivity configuration involving an anchor and an assisting eNB would end up in a new target anchor cell, the source anchor may need to check whether it allows and/or the UE is able to cope with the resulting configuration consisting of the anchor and the assisting bearer configuration.

Some embodiments of inventive concepts may make it possible to allocate resources for a new UE bearer at the assisting eNB or a UE bearer that may need to be handed to the assisting eNB within the limits the UE radio capabilities and/or the anchor eNB allows. Without embodiments disclosed herein, the assisting eNB might allocate resources that go beyond the UE's capabilities or are not within limits the anchor eNB would allow. This may lead to wrong resource configuration at the UE and hence to at least the inability to allocate resources at the assisting cell at all or to loss of the radio connection towards the UE.

Impact of Small Cell Enhancements to RRC Functions

Control plane architecture for small cell enhancements have been discussed. A focus of these discussions has been to make a general picture of RRC protocol termination as well as location of RRM functions.

In the following portions of this disclosure, RRC functions and how they should be handled in the case when the UE utilizes radio resources over multiple eNBs connected with non-ideal backhaul are discussed.

For the analysis below, two different scenarios are assumed: RRC entity of the UE can be centralized (alternatives C1 and C2) or distributed (alternatives C3 and C4).

The term "dual connectivity" is used to refer to operation where the UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. The following terminology is used:

the Anchor eNB has primary responsibility for maintaining the UE's RRC context and terminating the S1-MME interface towards the MME.

the Assisting eNB provides additional radio resources for the UE.

Overview of RRC Functions

In TS 36.331, RRC functions are listed. It can be assumed that dual connectivity is used only in RRC CONNECTED mode and thus also functions related to RRC CONNECTED mode are relevant for this disclosure. Significant functions for the case when the UE is already in CONNECTED mode include:

1. Broadcast of system information:
2. RRC connection control:
  a. Paging;
  b. RRC connection mobility including e.g. intra-frequency and inter-frequency handover, associated security handling, i.e. key/algorithm change, specification of RRC context information transferred between network nodes;
  c. Establishment/modification/release of RBs carrying user data (DRBs);
  d. Radio configuration control including e.g. assignment/modification of ARQ configuration, HARQ configuration, DRX configuration;
  e. In case of CA, cell management including e.g. change of PCell, addition/modification/release of SCell(s) and addition/modification/release of STAG(s);
  f. QoS control including assignment/modification of semi-persistent scheduling (SPS) configuration information for DL and UL, assignment/modification of parameters for UL rate control in the UE, i.e. allocation of a priority and a prioritized bit rate (PBR) for each RB;
  g. Recovery from radio link failure;
3. Measurement configuration and reporting:
4. Other functions including e.g. transfer of dedicated NAS information and non-3GPP dedicated information, transfer of UE radio access capability information, support for E-UTRAN sharing (multiple PLMN identities);

Each of these functions is described separately below.

Broadcast of System Information

Broadcast information carries both NAS and AS related information. For NAS related information, only anchor cell information is relevant for UEs in dual connectivity as the anchor eNB holds the S1-MME connection towards the CN. For AS related information, each involved cell needs to be taken into account.

Assuming eNBs operating stand-alone and dual connectivity mode, system broadcast will be available for both modes of connectivity. However, a given UE could get these parameters from various sources. So for acquisition of System Information in dual connectivity, two different solutions are possible:

1. UE gets System Information of Assisting Cell with dedicated RRC signaling from the Anchor eNB;
2. UE reads System Information broadcasted from the Assisting cell.

The first solution is similar to Carrier Aggregation where the Pcell provides relevant System Information to the UE with dedicated RRC signaling. This solution fits well to control plane alternatives C1/C2 where the anchor eNB maintains the UE's RRC context. This node then also has an overall understanding of all RRC parameters of the UE.

Change of System Information change may require extensive dedicated signaling, however, this is not necessarily a problem as it can be assumed that SI does not change.

The second solution may reduce an otherwise extensive amount of dedicated signaling but may require the Assisting eNB to always broadcast System Information. However, this would anyhow be necessary for standalone operation. This solution may increase complexity of the UE as it may need to monitor and maintain SI of many cells. In addition, in this solution, the UE may need to know which of the SI parameters are relevant for it so that there is no mismatch between the configuration provided by the Anchor and the Assisting eNB. However, this solution may provide smoother System Information changes as the other solution.

Proposal 1 RAN2 should evaluate the different solutions to provide System Information in the Assisting Cell to the UE.

Paging

Paging messages are monitored only in IDLE mode so they are not relevant for dual connectivity. However, if the UE needs to monitor System Information of the Assisting eNB, then it may need to monitor paging for notifications of System Information changes.

Proposal 2 Monitoring of the paging channel can be discussed after deciding System Information Acquisition procedure of the Assisting cell.

Measurements and RRC Connection Mobility

As the Anchor eNB maintains S1-MME interface towards the core network, it can be assumed to be mainly responsible for connection mobility control. Handovers to change the anchor eNB can follow closely the Rel-8 procedures.

It can be assumed that the UE needs to perform RSRP and RSRQ measurements both in the anchor and Assisting eNB. As measurement configuration is not changing often, it is reasonable to assume that this can be sent by the Anchor eNB.

When a certain condition is fulfilled, a measurement report is sent to the network. In C1 this is sent directly to the anchor eNB, whereas in C2, radio resources of the Assisting eNB can be used. In both alternatives, the measurements are processed by the Anchor eNB.

Also in C3 and C4 alternatives, it could be assumed that handover related measurements are centrally collected at the Anchor eNB. The difference to C1 and C2 is that there is an additional RRC connection between the UE and the Assisting eNB and thus there are maybe several ways how the anchor would receive relevant measurements concerning the RRC connection of the Assisting cell: either directly from the UE via the RRC connection of the anchor cell or from the Assisting eNB.

As the anchor eNB issues the handover command to the UE, it is responsible for the final handover decision and negotiates HO with the target eNB, then the HO command is sent to the UE by the anchor eNB. In control plane alternative C1, the HO command is sent via resources of the anchor eNB whereas in control plane alternative C2, those can also be sent via the Assisting cell. The target eNB can be either the Assisting eNB or some other eNB.

In C3 and especially in C4, RRC Connection mobility could concern the assisting RRC connection only. But also in this case the Anchor eNB is assumed to be the main decision entity which should issue any reconfiguration command to the UE via the Anchor RRC connection.

Proposal 3 As the Anchor eNB maintains the S1-MME interface, it can be considered as the main responsible for HO decisions Establishment/Modification/Release of DRBs Because the Anchor eNB maintains S1-MME interface towards the core network and thus knows EPS bearer characteristics, it can also be assumed to be main responsible for establishing and releasing DRBs. However, decisions need to be coordinated between the eNBs involved in the communication.

In the UP architecture option where user plane split is done on EPS bearer level (architecture 1A), bearer establishment at the Assisting eNB may either occur when bearers already established at the Anchor eNB have to be moved to the Assisting eNB or when new bearers have to be established. This decision may depend on the Anchor or Assisting eNB's preferences and may be based on the offloading needs, as well as measurements reports. In control plane solution C1 and C2, the actual RRC message to perform the reconfiguration of DRB is sent by the Anchor eNB. An example signaling diagram between the eNBs when moving a DRB towards the Assisting eNB is illustrated in FIG. 16.

The UE sends a measurement report to the anchor eNB, which may make an offload decision based thereon. The anchor eNB then sends an offload request to the assisting eNB, which makes an admission control to see if it is able to provide radio resources meeting the offload request. The assisting eNB then sends an offload acknowledgment to the anchor eNB including the radio resource configuration for the UE connection with the assisting eNB. The anchor eNB sends the RRC connection reconfiguration message, including the radio resource configuration of both anchor and assisting eNB to the UE. The anchor eNB may also deliver buffered data packets and data packets in transit to the assisting eNB. The anchor eNB may thus send a status transfer to the assisting eNB and data forwarding to the assisting eNB. The assisting eNB buffers such data packets received from the anchor eNB (to be delivered when connection to UE has been established between the assisting eNB and the UE). Finally, UE sends a synchronization message to the assisting eNB and confirms reconfiguration by sending an RRC connection reconfiguration complete message to the anchor eNB. It is noted that messages may be named in different ways, e.g. in view of radio access technology.

Proposal 4 As the Anchor eNB maintains the S1-MME interface, it can be considered as the main responsible for establishment, modification, and release of DRBs.

Figure 16:
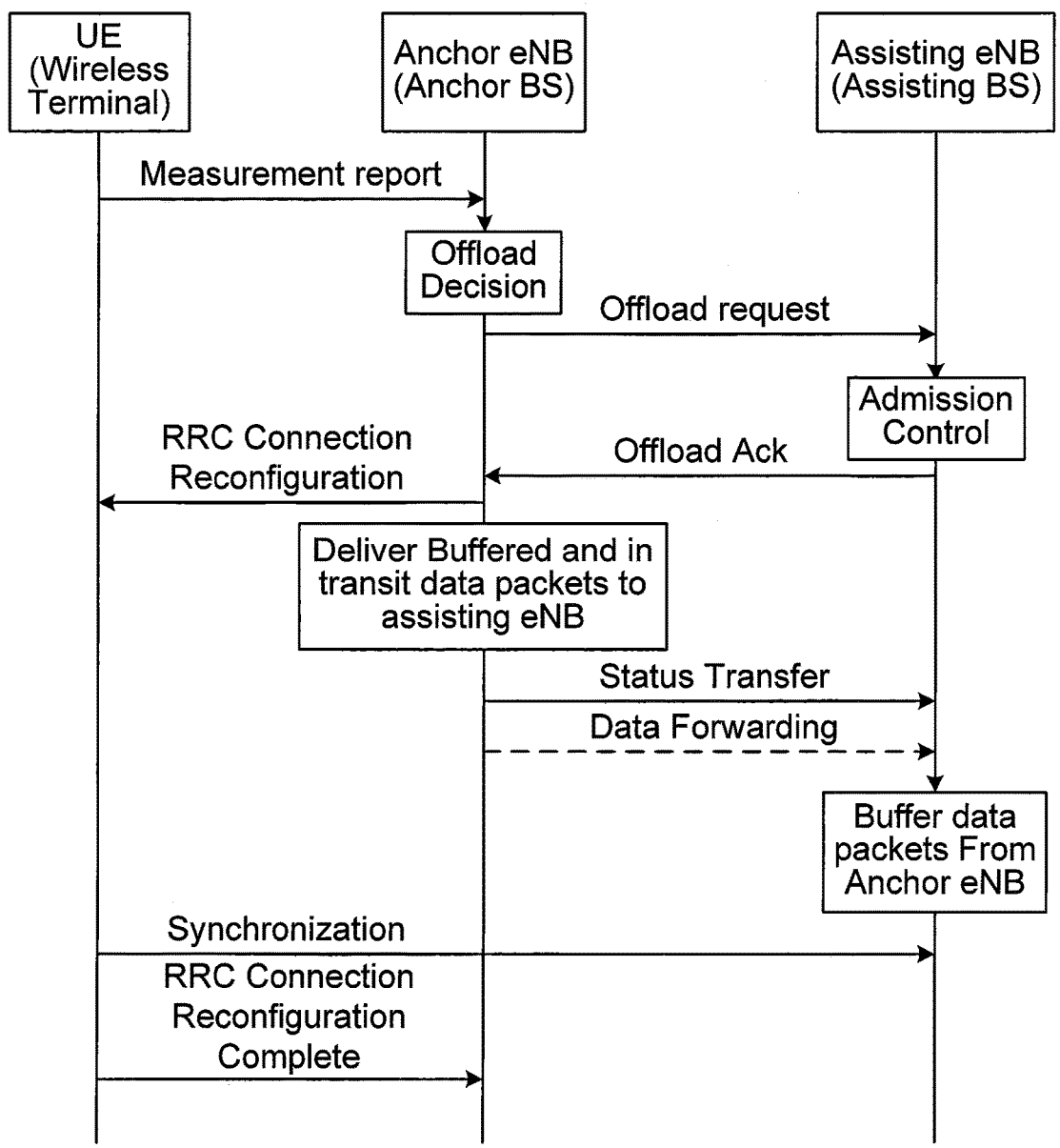
FIG. 16 is a signaling diagram illustrating movement of a bearer towards an assisting eNB according to some embodiments.

FIG. 16 is a signaling diagram of moving a bearer towards the Assisting eNB

Radio Configuration Control

Because each eNB should be able to act both as a stand-alone eNB and as Assisting eNBs, each node should be responsible for its radio resources and suitable lower layer configuration. Therefore a distributed RRM architecture may be needed. The actual RRC signaling towards the UE for assisting cell related radio resources:

for alternatives C1 and C2 this is performed by the Anchor eNB;

for alternatives C3 and C4, this may be performed either by the Anchor or the Assisting eNB.

For control plane alternatives C1 and C2, the following steps could be considered:

1. Anchor eNB provides current radio resource configurations and capabilities of the UE to the Assisting eNB.
2. The Assisting eNB decides the parameters relevant for the Assisting node and signals these to the Anchor eNB.
3. The Anchor eNB signals the final parameters to the UE (and to the Assisting eNB).

It would be worth to discuss in which way the Anchor eNB should be allowed to influence/assess the configuration provided by the Assisting eNB.

The gain of this solution is that as for the current model with a single RRC connection, a single set of SRB1/SRB2 is sufficient and only one set of PDCP keys for CP is needed. In addition, only one node takes the final decision of the RRC configuration and by nature a single eNB keeps the overall control easily. On the other hand, a drawback may be delay due to back-and-forth signaling.

For control plane alternatives C3 and C4, the following steps could be considered:
1. The Anchor eNB provides current radio resource configurations and capabilities of the UE to the Assisting eNB.
2. The Assisting eNB decides the parameters relevant for the Assisting eNB and signals these to the UE.

It is assumed that the Anchor eNB would need to be informed about the resulting configuration to be able to keep overall control.

A negative impact of this solution may be that RRC messages are generated in different nodes and two sets of PDCP keys may be needed. On the other hand, the configuration delay can be slightly shorter compared to the first solution. If the Anchor eNB would need to have a "final say" on the configuration provided by the Assisting eNB (e.g., due to limited capabilities), this advantage would be gone.

Proposal 5 There is no significant gain in sending radio resource configurations directly from the Assisting eNB. Thus one RRC entity in the UE and the network side may be preferred.

Radio Link Failures and Radio Link Monitoring

One of the RRC functions is handling of Radio Link Failure (RLF). Radio Link Monitoring (RLM) is not an RRC function but closely related to RLF procedures and thus it is discussed together here.

The following options for RLM and RLF functions are listed:
1. No RLM and RLF functions in the Assisting cell;
2. Independent RLM and RLF functions in the Anchor and Assisting eNB;
3. RLM in both cells but RLF functions coordinated.

In Carrier Aggregation, there is no Radio Link Monitoring of the SCell, similar to option 1. Instead, SCell additions and activations can be made based on CQI, RSRP, RSRQ, etc. However, a problem of this approach may be that if the connection to the Anchor eNB gets very poor, then the UE might trigger RLF and potentially looses the RRC connection and go to the idle state even if the UE has a good connection to the Assisting eNB. A similar problem can be assumed for the solution where there are independent RLF functions. In dual connectivity mode, it could be assumed that the UE could have a good link towards the Assisting eNB while poor link towards the Anchor eNB. In this situation it is not reasonable to declare the RLF. To solve/address/reduce this problem, coordination of RLF functions should be considered as a solution (option 3). In this scheme, only when links to both eNBs fail. This kind of approach may improve mobility robustness discussed in R2-131211, "Enhancing mobility robustness and offloading potential with RRC diversity," Ericsson, ST-Ericsson, RAN2#81bis, Chicago, April 2013.

Proposal 6 RAN2 should evaluate different alternatives for RLM and RLF functions.

CONCLUSION

In this disclosure, the impact of dual connectivity for different RRC functions has been evaluated, and the following proposals are provided:

Proposal 1 RAN2 should evaluate the different solutions to provide System Information in the Assisting Cell Proposal 2 Monitoring of the paging channel can be discussed after deciding System Information Acquisition procedure of the Assisting cell.

Proposal 3 As the Anchor eNB maintains the S1-MME interface, it can be considered as the main responsible for HO decisions Proposal 4 As the Anchor eNB maintains the S1-MME interface, it can be considered as the main responsible for establishment, modification, and release of DRBs.

Proposal 5 There is no significant gain in sending radio resource configurations directly from the Assisting eNB. Thus one RRC entity in the UE and the network side may be preferred.

Proposal 6 RAN2 should evaluate different alternatives for RLM and RLF functions Furthermore, it may be useful to list the relevant RRC functions in the TR and evaluate further different alternatives.

Proposal 7 The following RRC functions and comparison of alternatives should be included in the TR 36.842: 1) System Information acquisition 2) Paging 3) Measurements and RRC Connection control 4) Establishment/modification/release of DRBs 5) Radio configuration control and 6) Radio link failures and radio link monitoring.

Figure 17:
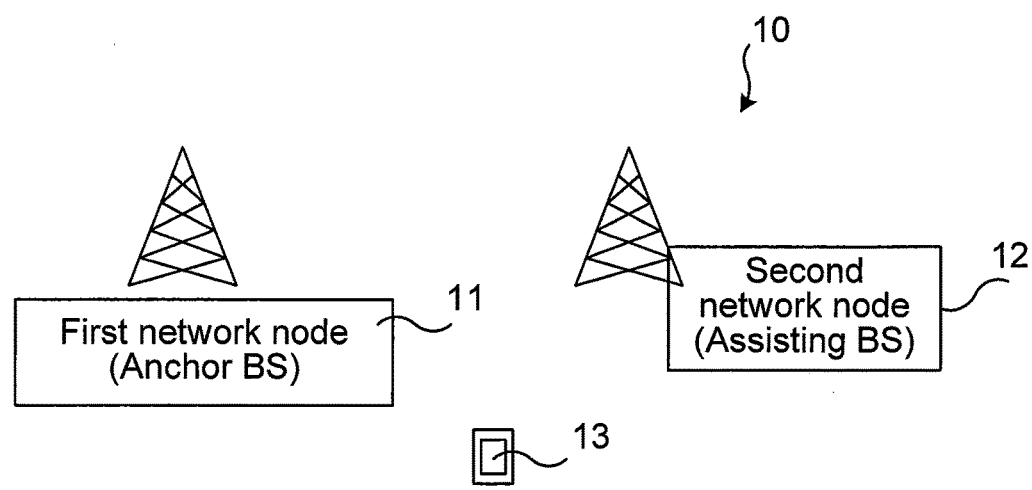
FIG. 17 illustrates an environment in which embodiments of the present disclosure may be implemented.

FIG. 17 illustrates an environment in which embodiments of the present disclosure may be implemented. A communication system 10 in which embodiments of the present disclosure may be implemented comprises at least two network nodes 11, 12 that are capable of providing wireless communication links to a communication device 13. The communication device 13 may, as mentioned earlier, comprise any device that receives data from the communication network 10, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc. A first network node 11 may for example have the functions of an anchor base station (BS) and a second network node 12 may have the tasks of an assisting BS, such functions having been described earlier. It is noted that, and as has been mentioned earlier, a particular network node may act as an anchor BS towards a first communication device and as an assisting BS towards a second communication device.

Figure 18:
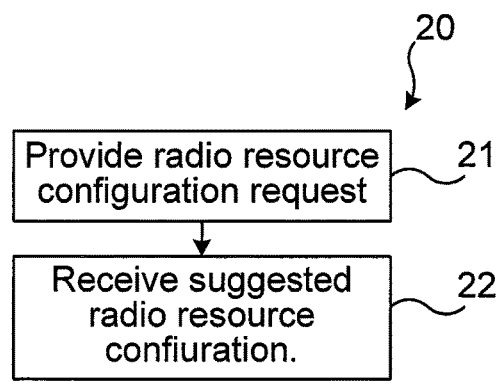
FIG. 18 illustrates a flow chart over steps of a method according to an aspect of the present disclosure.

FIG. 18 illustrates a flow chart over steps of a method according to an aspect of the present disclosure. The method 20 is performed in a first network node (e.g. anchor network node) for enabling dual connectivity for a communication device 13 with the first network node 11 and (at least) a second network node 12. The communication device 13 has at least one radio bearer set up with the first network node 11. The method 20 comprises providing 21, to the second network node 12 (e.g. an assisting network node or a target network node), a radio resource configuration request for the communication device 13 and limits within which the second network node 12 is to configure radio resources for the communication device 13. The radio resource configuration may, as has been described earlier (refer e.g. to FIG. 14 and related description) comprise a current configuration request of the communication device 13, or a target configuration request comprising the configuration to be used by the communication device 13 when in dual connectivity with the first and the second network nodes 11, 12.

The method 20 comprises receiving 22, from the second network node 12, a suggested radio resource configuration for the communication device 13. Based on the configuration that the second network node 12 receives from the first network node 11, the second network node 12 may suggest a configuration for use by the UE if handing over an existing bearer from the first network node 11 to the second network node 12 or if setting up a new bearer with the second network node 12.

In an embodiment, the method 20 comprises determining, based on the suggested radio resource configuration, whether the second network node 12 has allocated radio resources according to the provided radio resource configuration request and within the limits.

In a variation of the above embodiment, the method 20 comprises, based on the suggested radio resource configuration it is determined that the second network node 12 has not allocated radio resources according to the provided radio resource configuration and within the limits, repeating:

providing, to the second network node 12, a radio resource configuration request and the limits within which the second network node 12 is to configure the radio resources for the communication device, and receiving of a suggested radio resource configuration from the second network node 12.

That is, a negotiation between the first and second network nodes 11, 12 is effectuated until a radio resource configuration for the communication device can be agreed upon by both network nodes. This agreed upon radio resource configuration is then fulfilling requirements such as being within the limits of the capabilities of the communication device 13, such that both network nodes 11, 12 is able to fulfil e.g. required QoS etc.

In an embodiment, the limits within which the second network node 12 is to configure radio bearers for the communication device 13 comprises limits of the capabilities of the communication device 13 and/or limitations of the second network node 12.

In an embodiment, the providing 21 comprises providing, in a message requesting a handover or in a message requesting a setup, information about a current radio resource configuration.

In an embodiment, the providing 21 comprises providing, in a message requesting a handover or in a message requesting a setup, information about a target radio resource configuration.

In variations of the above two embodiments, the message is an X2 message and wherein a transparent container is used for the message, the contents of the container being transparent to an X2 interface.

In an embodiment, the method 20 comprises:
configuring the communication device 13 with measurement reporting configurations, and
receiving, from the communication device 13, measurement reports when reporting criteria are met.

In an embodiment, the method 20 comprises signaling to the communication device 13 a radio resource reconfiguration based on the suggested radio resource configuration.

In an embodiment, the radio bearer comprises an evolved radio access bearer, which in turn comprises a bearer from the first network node 11 to a core network node and at least one radio bearer from the communication device 13 over a radio access interface to the first network node 11 and/or to the second node 12.

Figure 19:
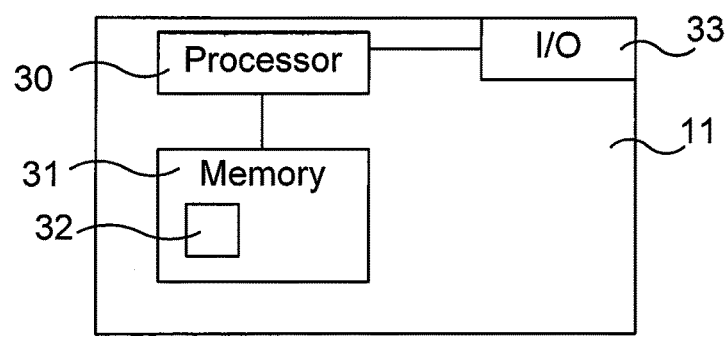
FIG. 19 illustrates schematically a network node and means for implementing methods of the present disclosure.

FIG. 19 illustrates schematically a first network node 11 and means for implementing methods of the present disclosure. The first network node 11 comprises a processor 30 comprising any combination of one or more of a central processing unit (CPU), multiprocessor, microcontroller, digital signal processor (DSP), application specific integrated circuit etc. capable of executing software instructions stored in a memory 31, which can thus be a computer program product 31. The processor 30 can be configured to execute any of the various embodiments of the method as described herein, for example in relation to FIG. 18.

The first network node 11 comprises an input/output device 33, e.g. an interface, by means of which it is able to communicate with other network nodes (e.g. the second network node 12). The first network node 11 also comprises means (not explicitly disclosed) for communicating wirelessly with the communication device 13, means such as receiving circuitry, transmitting circuitry, antenna devices etc.

In particular, a first network node 11 is provided for enabling dual connectivity for a communication device 13 with the first network node 11 and a second network node 12, wherein the communication device 13 has at least one radio bearer set with the first network node 11. The first network node 11 comprises a processor 30 and memory 31, the memory 31 containing instructions executable by the processor 30, whereby the first network node 11 is operative to perform the method as described. The first network node 11 is thus operative to:

provide, to the second network node 12, a radio resource configuration request for the communication device 13 and limits within which the second network node 12 is to configure radio resources for the communication device 13, and receive, from the second network node 12, a suggested radio resource configuration for the communication device 13.

The first network node 11 may thus comprise a processor 30 and a memory 31 storing instructions that, when executed by the processor 30 causes the first network node to perform any of the methods as has been described.

In an embodiment, the first network node 11 is operative to determine, based on the suggested radio resource configuration, whether the second network node 12 has allocated radio resources according to the provided radio resource configuration request and within the limits.

In an embodiment, the first network node 11 is operative to, when based on the suggested radio resource configuration it is determined that the second network node 12 has not allocated radio resources according to the provided radio resource configuration and the limits, repeat:

the providing, to the second network node 12, a radio resource configuration request and the limits within which the second network node 12 is to configure the radio resources for the communication device, and the receiving of a suggested radio resource configuration from the second network node 12.

In various embodiments, the limits within which the second network node 12 is to configure radio bearers for the communication device 13 comprises limits of the capabilities of the communication device 13 and/or limitations of the second network node 12.

In an embodiment, the first network node 11 is operative to provide by providing, in a message requesting a handover or in a message requesting a setup, information about a current radio resource configuration.

In an embodiment, the first network node 11 is operative to provide by providing, in a message requesting a handover or in a message requesting a setup, information about a target radio resource configuration.

In variations of the above two embodiments, the message is an X2 message and wherein a transparent container is used for the message, the contents of the container being transparent to an X2 interface.

In an embodiment, the first network node 11 is operative to:
configure the communication device 13 with measurement reporting configurations, and
receive, from the communication device 13, measurement reports when reporting criteria are met.

In an embodiment, the first network node 11 is operative to signal to the communication device 13 a radio resource reconfiguration based on the suggested radio resource configuration.

In an embodiment, the radio bearer comprises an evolved radio access bearer, which in turn comprises a bearer from the first network node 11 to a core network node and at least one radio bearer from the communication device 13 over a radio access interface to the first network node 11 and/or to the second node 12.

Still with reference to FIG. 19, the memory 31 can be any combination of read and write memory (RAM) and read only memory (ROM). The memory 31 also comprises persistent storage, which, for example, can be any single one or combination of magnetic memory, optical memory, solid state memory or even remotely mounted memory.

A data memory may also be provided (not illustrated) for reading and/or storing data during execution of software instructions in the processor 30. The data memory can be any combination of read and write memory (RAM) and read only memory (ROM).

The present disclosure also encompasses a computer program product 31 comprising a computer program 32 for implementing the methods as described above, and a computer readable means on which the computer program 32 is stored. The present teachings thus comprise a computer program 32 for a first network node 11 for enabling dual connectivity for a communication device 13 with the first network node and a second network node 12, wherein the communication device 13 has at least one radio bearer set up with the first network node 11. The computer program 32 comprises computer program code, which, when run on the first network node causes the first network node 11 to:
provide, to an second network node 12, a radio resource configuration request for the communication device 13 and limits within which the second network node 12 is to configure radio resources for the communication device 13, and
receive, from the second network node 12, a suggested radio resource configuration for the communication device 13.

The computer program product, or the memory, thus comprises instructions executable by the processor. Such instructions may be comprised in a computer program, or in one or more software modules or function modules.

Figure 22:
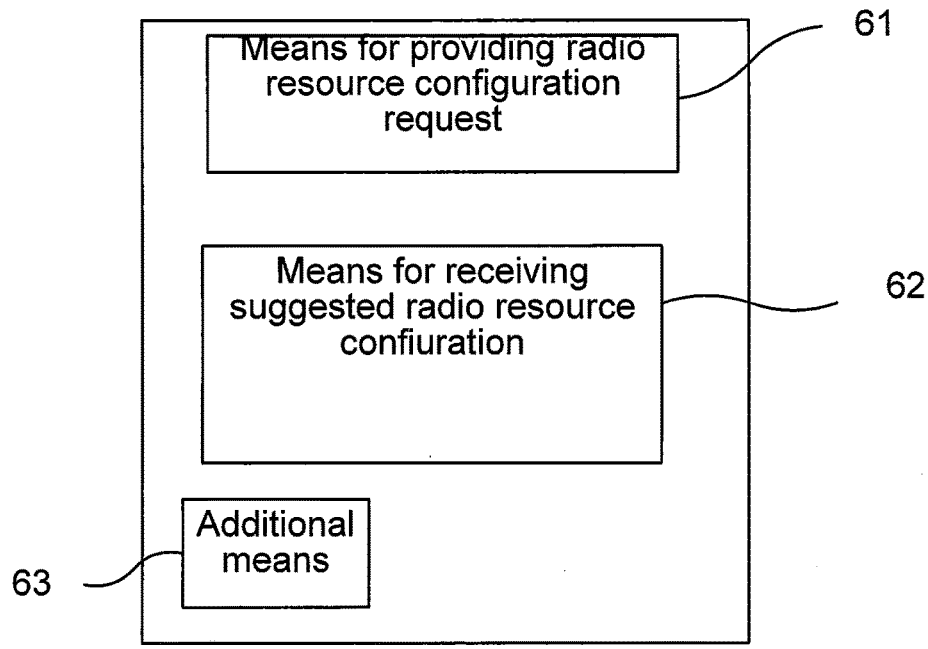
FIG. 22 illustrates a first network node comprising function modules/software modules for implementing embodiments of the methods of the present disclosure.

The first network node 11 may comprise functions modules for implementing methods of the present disclosure, as illustrated schematically in FIG. 22. The first network node may comprises first means 61, in particular a first function module, for providing, to an second network node 12, a radio resource configuration request for the communication device 13 and limits within which the second network node 12 is to configure radio resources for the communication device 13. The first network node 11 may comprises second means 62, in particular a second function module, for receiving, from the second network node 12, a suggested radio resource configuration for the communication device 13.

The first network node may comprise still further function modules for performing the various embodiments of the present disclosure, as indicated at reference numeral 63. For instance, the first network node may comprise a function module for providing, in a message requesting a handover or in a message requesting a setup, information about a current radio resource configuration.

As another example, the first network node may comprise a function module for providing, in a message requesting a handover or in a message requesting a setup, information about a target radio resource configuration.

As still another example, the first network node may comprise a function module for configuring the communication device 13 with measurement reporting configurations, and a function module for receiving, from the communication device 13, measurement reports when reporting criteria are met.

As another example, the first network node may comprise a function module for signaling to the communication device 13 a radio resource reconfiguration based on the suggested radio resource configuration.

As another example, the first network node may comprise a function module for, when based on the suggested radio resource configuration it is determined that the second network node has not allocated radio resources according to the provided radio resource configuration and within the limits, repeating:
providing, to the second network node 12, a radio resource configuration request and the limits within which the second network node 12 is to configure radio resources for the communication device, and
receiving of a suggested radio resource configuration from the second network node 12.

The function modules can be implemented using software instructions such as computer program executing in a processor and/or using hardware, such as application specific integrated circuits, field programmable gate arrays, discrete logical components etc.

Figure 20:
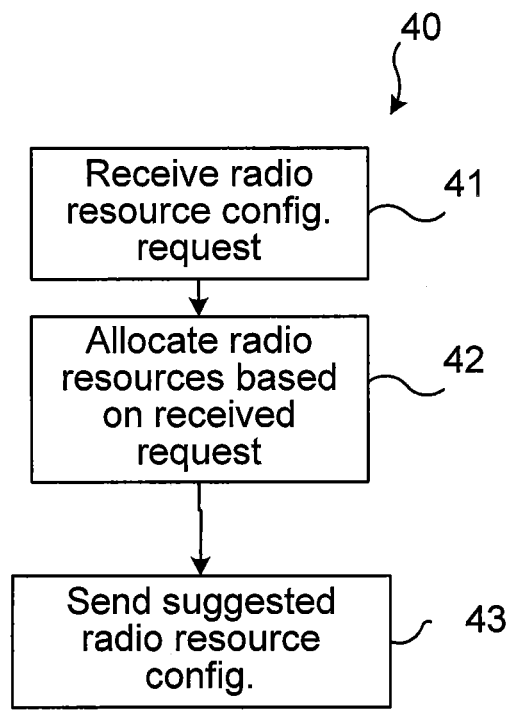
FIG. 20 illustrates a flow chart over steps of a method according to an aspect of the present disclosure.

FIG. 20 illustrates a flow chart over steps of a method according to an aspect of the present disclosure. The method 40 may be performed in a second network node 12 for enabling dual connectivity for a communication device 13 with a first network node 11 and the second network node 12, wherein the communication device 13 has at least one radio bearer set up at the first network node 11. The method 40 comprises receiving 41, from the first network node 11, a radio resource configuration request for the communication device 13 and limits within which to configure radio resources for the communication device 13.

The method 40 comprises allocating 42 radio resources for the communication device 13 based on the received radio resource configuration request for the communication device 13 and the limits.

The method 40 comprises sending 43 a suggested radio resource configuration to the first network node 11.

Figure 21:
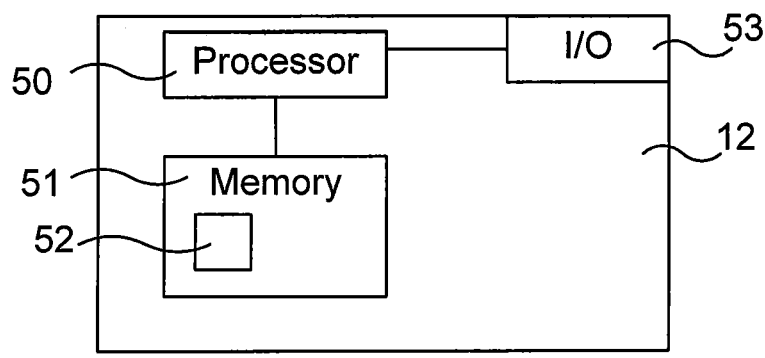
FIG. 21 illustrates schematically a network node and means for implementing methods of the present disclosure.

FIG. 21 illustrates schematically a network node and means for implementing methods of the present disclosure. The second network node 12 comprises a processor 50 comprising any combination of one or more of a central processing unit (CPU), multiprocessor, microcontroller, digital signal processor (DSP), application specific integrated circuit etc. capable of executing software instructions stored in a memory 51, which can thus be a computer program product 51. The processor 50 can be configured to execute any of the various embodiments of the method as described herein, for example in relation to FIG. 20.

The second network node 12 comprises an input/output device 53, e.g. an interface, by means of which it is able to communicate with other network nodes (e.g. the first network node 11). The second network node 12 also comprises means (not explicitly disclosed) for communicating wirelessly with the communication device 13, means such as receiving circuitry, transmitting circuitry, antenna devices etc.

In particular, a second network node 12 is provided for enabling dual connectivity for a communication device 13 with a first network node 11 and the second network node wherein the communication device 13 has at least one radio bearer set up at the first network node 11, for which radio bearer radio bearer radio resources are needed. The second network node 12 comprises a processor 50 and memory 51, the memory 51 containing instructions executable by the processor 50, whereby the second network node 12 is operative to:

receive, from the first network node 11, a radio resource configuration request for the communication device 13 and limits within which to configure radio resources for the communication device 13, allocate resources for the communication device 13 based on the received radio resource configuration request for the communication device 13 and the limits, and send a suggested radio resource configuration to the first network node 11.

The second network node 12 may thus comprise a processor 50 and a memory 51 storing instructions that, when executed by the processor 50 causes the second network node 12 to perform any of the methods as has been described.

In an embodiment, the radio bearer comprises an evolved radio access bearer, which in turn comprises a bearer from the first network node 11 to a core network node and at least one radio bearer from the communication device 13 over a radio access interface to the first network node 11 and/or to the second node 12.

Still with reference to FIG. 21, the memory 51 can be any combination of read and write memory (RAM) and read only memory (ROM). The memory 51 also comprises persistent storage, which, for example, can be any single one or combination of magnetic memory, optical memory, solid state memory or even remotely mounted memory.

A data memory may also be provided (not illustrated) for reading and/or storing data during execution of software instructions in the processor 50. The data memory can be any combination of read and write memory (RAM) and read only memory (ROM).

The present disclosure also encompasses a computer program product 51 comprising a computer program 52 for implementing the methods as described above, and a computer readable means on which the computer program 52 is stored. The present disclosure thus comprise a computer program 52 for a second network node 12 for enabling dual connectivity for a communication device 13 with a first network node and the second network node 12, wherein the communication device 13 has at least one radio bearer set up at a first network node 11, for which radio bearer radio bearer radio resources are needed. The computer program 52 comprises computer program code, which, when run on the second network node 12 causes the second network node 12 to:

receive, from the first network node 11, a radio resource configuration request for the communication device 13 and limits within which to configure radio resources for the communication device 13, allocate resources for the communication device 13 based on the received radio resource configuration request for the communication device 13 and the limits, and send a suggested radio resource configuration to the first network node n.

The computer program product, or the memory, thus comprises instructions executable by the processor. Such instructions may be comprised in a computer program, or in one or more software modules or function modules.

Figure 23:
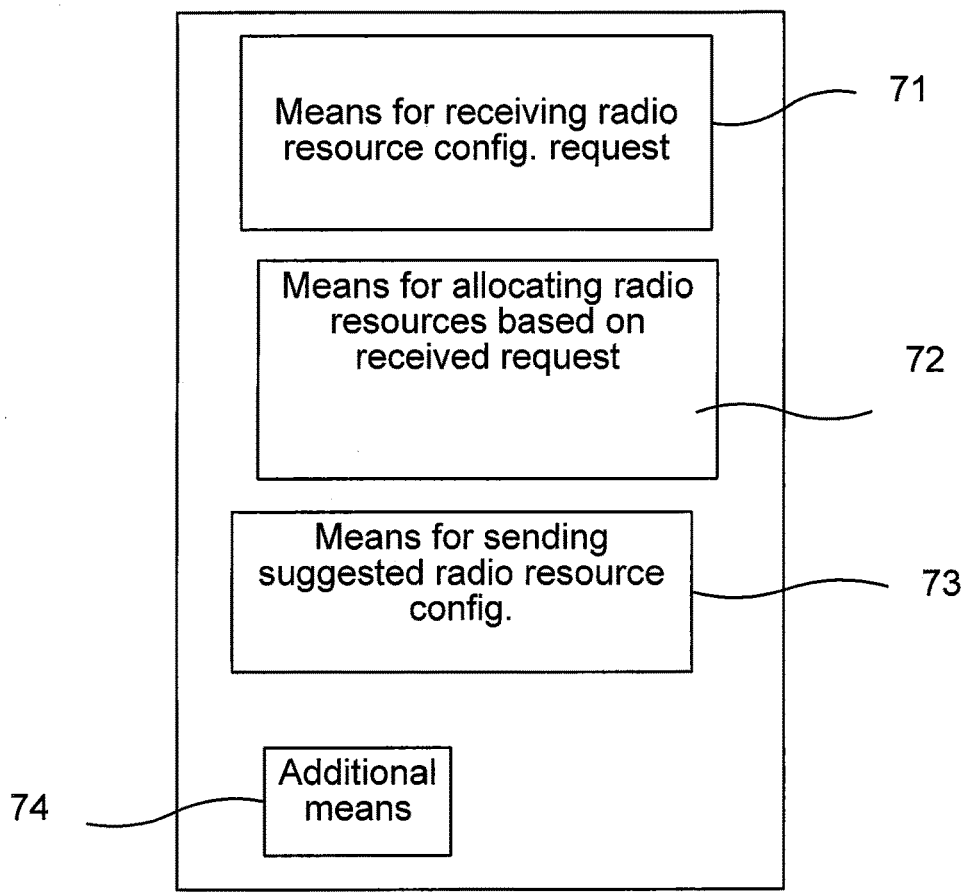
FIG. 23 illustrates a second network node comprising function modules/software modules for implementing embodiments of the methods of the present disclosure.

The second network node 12 may comprise functions modules for implementing methods of the present disclosure, as illustrated schematically in FIG. 23. The second network node may comprises first means 71, e.g. a first function module, for receiving, from the first network node 11, a radio resource configuration request for the communication device 13 and limits within which to configure radio resources for the communication device 13. The second network node may comprises second means 72, e.g. a second function module, for allocating resources for the communication device 13 based on the received radio resource configuration request for the communication device 13 and the limits. The second network node may comprise third means 73, e.g. a third function module, for sending a suggested radio resource configuration to the first network node 11.

The second network node may comprise still further function modules for performing the various embodiments of the present disclosure, as indicated at reference numeral 74.

The function modules can be implemented using software instructions such as computer program executing in a processor and/or using hardware, such as application specific integrated circuits, field programmable gate arrays, discrete logical components etc.

It is again noted that e.g. the first network node 11 may be configured to perform the method as described in relation to FIG. 18 and the method as described in relation to FIG. 20. That is, the first network node 11 may act as the anchor BS towards one communication device 13 and as an assisting BS towards another communication device.

Abbreviations:
3GPP 3rd Generation Partnership Project
AMBR Aggregate Maximum Bit Rate
ARP Allocation and Retention Priority
BCH Broadcast Channel
CIO Cell Individual Offset
CN Core Network
CRS Cell specific Reference Symbol
DL Downlink
DRB Data Radio Bearer
E-UTRAN Evolved UMTS Terrestrial Radio Access Network
eNB/eNodeB enhanced Node B (base station)
EPC Evolved Packet Core
EPS Evolved Packet System
GBR Guaranteed Bit Rate
HARQ Hybrid Automatic Repeat reQuest
HeNB Home eNB
IE Information Element
LTE Long Term Evolution
MAC Medium Access Control
MBR Maximum Bit Rate
MME Mobility Management Entity
MTCP Multi-path Transmission Control Protocol
NAS Non-Access Stratum P-GW PDN Gateway
PCI Physical Cell Identity
PDCP Packet Data Convergence Protocol
PDN Packet Data Network
PDU Packet Data Unit
PSS Primary Synchronization Signal
QCI QoS Class Identifier
QoS Quality of Service
RLC Radio Link Control
RAB Radio Access Bearer
RE Resource Element
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
S-GW Serving Gateway
SDF Service Data Flow
SDU Service Data Unit
SRB Signaling Radio Bearer
SSS Secondary Synchronization Signal
TTT Time To Trigger
UE User Equipment In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

The invention claimed is:

1. A method performed in a first network node of configuring a connection between a communication device and a second network node, wherein the communication device has at least one radio bearer set up with the first network node, the method comprising:
    providing, to the second network node, a current radio resource configuration of the communication device and limits within which the second network node is to select a suggested radio resource configuration for the communication device,
    receiving, from the second network node, a suggested radio resource configuration for the communication device,
    determining, based on the suggested radio resource configuration, whether the second network node has allocated radio resources according to the current radio resource configuration and within the limits,
    based on the suggested radio resource configuration, if it is determined that the second network node has not allocated radio resources according to the current radio resource configuration and within the limits, repeating operations comprising:
        providing, to the second network node, the current radio resource configuration and the limits within which the second network node is to select the suggested radio resource configuration for the communication device, and
        receiving of the suggested radio resource configuration from the second network node.

2. The method as claimed in claim 1, wherein the limits within which the second network node is to select a suggested radio resource configuration for the communication device comprises limits of the capabilities of the communication device and/or limitations of the second network node.

3. The method as claimed in claim 1, wherein the providing comprises providing, in a message requesting a handover or in a message requesting a setup, information about the current radio resource configuration.

4. The method as claimed in claim 3, wherein the message is an X2 message and wherein a transparent container is used for the message, the contents of the container being transparent to an X2 interface.

5. The method as claimed in claim 1, wherein the providing comprises providing, in a message requesting a handover or in a message requesting a setup, information about a target radio resource configuration.

6. The method as claimed in claim 1, further comprising:
    configuring the communication device with measurement reporting configurations; and
    receiving, from the communication device, measurement reports when reporting criteria are met.

7. The method as claimed in claim 1, further comprising:
    signaling to the communication device a radio resource reconfiguration based on the suggested radio resource configuration.

8. The method as claimed in claim 1, wherein the radio bearer comprises an evolved radio access bearer, which in turn comprises a bearer from the first network node to a core network node and at least one radio bearer from the communication device over a radio access interface to the first network node and/or to the second node.

9. A first network node for configuring a connection between a communication device and a second network node, wherein the communication device has at least one radio bearer set up with the first network node, the first network node comprising a processor and memory, the memory containing instructions executable by the processor, whereby the first network node is operative to perform operations comprising:
    providing, to the second network node, a current radio resource configuration of the communication device and limits within which the second network node is to select a suggested radio resource configuration for the communication device,
    receiving, from the second network node, a suggested radio resource configuration for the communication device,
    determining, based on the suggested radio resource configuration, whether the second network node has allocated radio resources according to the current radio resource configuration and within the limits,
    based on the suggested radio resource configuration, if it is determined that the second network node has not allocated radio resources according to the current radio resource configuration and within the limits, repeating operations comprising:
        the providing, to the second network node, the current radio resource configuration and the limits within which the second network node is to select the suggested the radio resource configuration for the communication device, and
        the receiving of the suggested radio resource configuration.

10. The first network node as claimed in claim 9, wherein the limits within which the second network node is to select a suggested radio resource configuration for the communication device comprises limits of the capabilities of the communication device and/or limitations of the second network node.

11. The first network node as claimed in claim 9, wherein the providing comprises providing, in a message requesting a handover or in a message requesting a setup, information about the current radio resource configuration.

12. The first network node as claimed in claim 11, wherein the message is an X2 message and wherein a transparent container is used for the message, the contents of the container being transparent to an X2 interface.

13. The first network node as claimed in claim 9, wherein the providing comprises providing, in a message requesting a handover or in a message requesting a setup, information about a target radio resource configuration.

14. The first network node as claimed in claim 9, wherein the first network node is further operative to perform operations comprising:
    configuring the communication device with measurement reporting configurations; and
    receiving, from the communication device, measurement reports when reporting criteria are met.

15. The first network node as claimed in claim 9, herein the first network node is further operative to perform operations comprising:
signaling to the communication device a radio resource reconfiguration based on the suggested radio resource configuration.

16. The first network node as claimed in claim 9, wherein the radio bearer comprises an evolved radio access bearer, which in turn comprises a bearer from the first network node to a core network node and at least one radio bearer from the communication device over a radio access interface to the first network node and/or to the second node.

17. A computer program product comprising computer program code for a first network node for configuring a connection between a communication device and a second network node, wherein the communication device has at least one radio bearer set up with the first network node, the computer program product comprising the computer program code and non-transitory computer readable means on which the computer program code is stored, which, when run on the first network node, the computer program code causes the first network node to perform operations comprising:
providing, to the second network node, a current radio resource configuration of the communication device and limits within which the second network node is to select a suggested radio resource configuration for the communication device,
receiving, from the second network node, a suggested radio resource configuration for the communication device,
determining, based on the suggested radio resource configuration, whether the second network node has allocated radio resources according to the current radio resource configuration and within the limits,
based on the suggested radio resource configuration, if it is determined that the second network node has not allocated radio resources according to the current radio resource configuration and within the limits, repeating operations comprising:
providing, to the second network node, the current radio resource configuration and the limits within which the second network node is to select the suggested the radio resource configuration for the communication device, and
receiving of the suggested radio resource configuration.

18. A method performed in a second network node for configuring a connection between a communication device and the second network node, wherein the communication device has at least one radio bearer set up at a first network node, for which radio bearer radio resources are needed, the method comprising:
receiving, from the first network node, a current radio resource configuration of the communication device and limits within which to select a suggested radio resource configuration for the communication device,
selecting a suggested radio resource configuration for the communication device based on the received current radio resource configuration of the communication device and the limits,
sending the selected radio resource configuration to the first network node,
if it is determined, by the first network node, based on the suggested radio resource configuration, that the second network node has not allocated radio resources according to the current radio resource configuration and within the limits, repeating operations comprising:
receiving, from the first network node, the current radio resource configuration of the communication device and limits within which to select the suggested radio resource configuration for the communication device, and
selecting the suggested radio resource configuration for the communication device based on the received current radio resource configuration of the communication device and the limits.

19. A second network node for configuring a connection between a communication device and the second network node, wherein the communication device has at least one radio bearer set up at a first network node, the second network node comprising a processor and memory, the memory containing instructions executable by the processor, whereby the second network node is operative to perform operations comprising:
receiving, from the first network node, a current radio resource configuration of the communication device and limits within which to select a suggested radio resource configuration for the communication device,
selecting a suggested radio resource configuration for the communication device based on the received current radio resource configuration of the communication device and the limits,
sending the selected suggested radio resource configuration to the first network node,
if it is determined, by the first network node, based on the suggested radio resource configuration, that the second network node has not allocated radio resources according to the current radio resource configuration and within the limits, repeating operations comprising:
receiving, from the first network node, the current radio resource configuration of the communication device and limits within which to select the suggested radio resource configuration for the communication device, and
selecting the suggested radio resource configuration for the communication device based on the received current radio resource configuration of the communication device and the limits.

20. The second network node as claimed in claim 19, wherein the radio bearer comprises an evolved radio access bearer, which in turn comprises a bearer from the first network node to a core network node and at least one radio bearer from the communication device over a radio access interface to the first network node and/or to the second node.

21. A computer program product comprising computer program code for a second network node for configuring a connection between a communication device and the second network node, wherein the communication device has at least one radio bearer set up at a first network node, the computer program product comprising the computer program code and non-transitory computer readable means on which the computer program code is stored, which, when run on the second network node, the computer program code causes the second network node to perform operations comprising:
receiving, from the first network node, a current radio resource configuration of the communication device and limits within which to select a suggested radio resource configuration for the communication device,
selecting a suggested radio resource configuration for the communication device based on the received current radio resource configuration of the communication device and the limits, sending the selected suggested radio resource configuration to the first network nod;

if it is determined, by the first network node, based on the suggested radio resource configuration, that the second network node has not allocated radio resources according to the current radio resource configuration and within the limits, repeating operations comprising:

receiving, from the first network node, the current radio resource configuration of the communication device and limits within which to select the suggested radio resource configuration for the communication device, and selecting the suggested radio resource configuration for the communication device based on the received current radio resource configuration of the communication device and the limits.

\* \* \* \* \*

UNITED STATES PATENT AND TRADEMARK OFFICE
CERTIFICATE OF CORRECTION

PATENT NO. : 9,681,352 B2  
APPLICATION NO. : 14/395845  
DATED : June 13, 2017  
INVENTOR(S) : Vesely et al.

Page 1 of 2

It is certified that error appears in the above-identified patent and that said Letters Patent is hereby corrected as shown below:

In the Drawings

In Fig. 8, Sheet 5 of 13, delete "$BCH_m$)" and insert -- $BCH_m$ --, therefor.

In Fig. 8, Sheet 5 of 13, delete "$BCH_p$)" and insert -- $BCH_p$ --, therefor.

In Fig. 9, Sheet 6 of 13, delete "$BCH_m$)" and insert -- $BCH_m$ --, therefor.

In Fig. 14, Sheet 8 of 13, in Step "4", Line 2, delete "for the to" and insert -- to --, therefor.

In the Specification

In Column 1, Line 63, delete "NodeB's)" and insert -- NodeBs) --, therefor.

In Column 4, Line 48, delete "picon" and insert -- pico --, therefor.

In Column 10, Line 50, delete "of" and insert -- or --, therefor.

In Column 22, Line 49, delete "node" and insert -- node 11 --, therefor.

In Column 24, Line 37, delete "node" and insert -- node 11 --, therefor.

In Column 25, Line 23, delete "(RAM)" and insert -- (RWM) --, therefor.

In Column 25, Line 32, delete "(RAM)" and insert -- (RWM) --, therefor.

In Column 25, Line 41, delete "node and" and insert -- node 11 and --, therefor.

In Column 25, Line 45, delete "node causes" and insert -- node 11 causes --, therefor.

Signed and Sealed this  
Thirty-first Day of July, 2018

Andrei Iancu  
*Director of the United States Patent and Trademark Office*

In Column 27, Line 13, delete "second network node" and insert -- second network node 12, --, therefor.

In Column 27, Line 42, delete "(RAM)" and insert -- (RWM) --, therefor.

In Column 27, Line 50, delete "(RAM)" and insert -- (RWM) --, therefor.

In Column 27, Lines 58-59, delete "first network node" and insert -- first network node 11 --, therefor.

In Column 28, Line 7, delete "n." and insert -- 11. --, therefor.

In the Claims

In Column 35, Line 2, in Claim 21, delete "nod;" and insert -- node, --, therefor.